United States Patent
Moriya

(10) Patent No.: US 8,197,025 B2
(45) Date of Patent: Jun. 12, 2012

(54) CORRECTION VALUE SETTING METHOD, LIQUID EJECTING APPARATUS, PRINTING SYSTEM AND STORAGE MEDIUM HAVING PROGRAM STORED THEREON

(75) Inventor: Hidekuni Moriya, Chino (JP)

(73) Assignee: Seiko Epson Corporation, Tokyo (JP)

( * ) Notice: Subject to any disclaimer, the term of this patent is extended or adjusted under 35 U.S.C. 154(b) by 580 days.

(21) Appl. No.: 12/400,430

(22) Filed: Mar. 9, 2009

(65) Prior Publication Data
US 2009/0231376 A1  Sep. 17, 2009

(30) Foreign Application Priority Data

Mar. 14, 2008  (JP) ................................. 2008-066414

(51) Int. Cl.
*B41J 29/393* (2006.01)

(52) U.S. Cl. ................................ 347/19; 347/15; 347/16

(58) Field of Classification Search .................... None
See application file for complete search history.

(56) References Cited

U.S. PATENT DOCUMENTS 6,690,471 B2 * 2/2004 Tandon et al. ................ 356/420
7,948,666 B2 * 5/2011 Yoshida et al. .............. 358/518

FOREIGN PATENT DOCUMENTS

JP  2005-205691  8/2005

* cited by examiner

*Primary Examiner* — Uyen Chau N Le
*Assistant Examiner* — Chad Smith
(74) *Attorney, Agent, or Firm* — DLA Piper LLP (US)

(57) ABSTRACT

A correction value setting method includes: generating, based on a first correction value that has been set in advance and is used in correcting a density of an image to be printed on a first medium, a second correction value that has a larger correction amount than the first correction value and a third correction value that has a smaller correction amount than the first correction value; printing respectively a first pattern to which the first correction value is applied, a second pattern to which the second correction value is applied, and a third pattern to which the third correction value is applied, on a second medium that differs in type from the first medium, by ejecting liquid from a head including a plurality of nozzles that eject liquid; and setting, based on the first pattern, the second pattern, and the third pattern that have been printed on the second medium, one of the first correction value, the second correction value, and the third correction value, as a correction value used in correcting a density of an image to be printed on the second medium.

8 Claims, 21 Drawing Sheets

| ROW REGION NUMBER | BRS CORRECTION VALUE | | |
|---|---|---|---|
| | Sa | Sb | Sc |
| 1 | Ha_1 | Hb_1 | Hc_1 |
| 2 | Ha_2 | Hb_2 | Hc_2 |
| 3 | Ha_3 | Hb_3 | Hc_3 |
| ⋮ | ⋮ | | |
| n | Ha_n | Hb_n | Hc_n |

FIG. 11

| EJECTION LIMIT VALUE | PAPER TYPE |
|---|---|
| 100% | WOOD FREE PAPER |
| 120% | MATTE PAPER A |
| 140% | MATTE PAPER B |
| 160% | GLOSS PAPER A |
| 180% | GLOSS PAPER B |

TONE VALUE CONVERSION TABLE

CORRECTION VALUE SETTING METHOD, LIQUID EJECTING APPARATUS, PRINTING SYSTEM AND STORAGE MEDIUM HAVING PROGRAM STORED THEREON

CROSS-REFERENCE TO RELATED APPLICATIONS

The present application claims priority upon Japanese Patent Application No. 2008-66414 filed on Mar. 14, 2008, which is herein incorporated by reference.

BACKGROUND

1. Technical Field

The present invention relates to correction value setting methods, liquid ejecting apparatuses, printing systems and storage media having a program stored thereon.

2. Related Art

Liquid ejecting apparatuses such as inkjet printers have multiple nozzles for ejecting liquid and print a print image by ejecting liquid to a medium. The print image is formed by lining up a myriad of pieces of image that consist of dot rows.

By the way, it is difficult to manufacture the above multiple nozzles completely in the same way because of influence by variation in precision of manufacturing and the like, and the nozzles with various diameters may be manufactured for example. And in the case where the diameters of the nozzles vary, sizes of dots ejected from the nozzles and formed on the medium may vary. Because of the variation in dot sizes in this way, inconsistencies in density occur among pieces of image. As a result thereof, streaky density unevenness appears in the print image.

Therefore, technologies for suppressing such density unevenness and improving image quality of a print image are proposed (refer to JP-A-2005-205691). In a density unevenness correction method in JP-A-2005-205691, a pattern for detecting density unevenness is printed, and correction values are obtained based on density data of the printed pattern. Then, density correction is performed based on the obtained correction values.

By the way, some printers can print an image on various types of media. In the case where types of media vary, variations occur in degree of liquid absorption due to variations in surface treatment (such as coating) of the media and the like. As a result, density unevenness of a print image varies depending on the types of the media even if dots are formed by ejecting ink from the same nozzle.

Conventionally, the correction values were obtained by printing the pattern for detecting density unevenness on a particular type of medium (that is, a dedicated paper). On the other hand, no correction value was obtained for a medium of an unknown type other than the dedicated paper. Therefore, density unevenness of a print image printed on a medium other than the dedicated paper cannot be appropriately suppressed.

SUMMARY

An advantage of some aspects of the present invention is to appropriately and easily suppress density unevenness of an image printed on a medium of an unknown type.

A primary aspect of the invention for solving the above issues is: a correction value setting method including: generating, based on a first correction value that has been set in advance and is used in correcting a density of an image to be printed on a first medium, a second correction value that has a larger correction amount than the first correction value and a third correction value that has a smaller correction amount than the first correction value; printing respectively a first pattern to which the first correction value is applied, a second pattern to which the second correction value is applied, and a third pattern to which the third correction value is applied, on a second medium that differs in type from the first medium, by ejecting liquid from a head including a plurality of nozzles that eject liquid; and setting, based on the first pattern, the second pattern, and the third pattern that have been printed on the second medium, one of the first correction value, the second correction value, and the third correction value, as a correction value used in correcting a density of an image to be printed on the second medium.

Other features of the present invention will be made clear through the present specification with reference to the accompanying drawings.

BRIEF DESCRIPTION OF THE DRAWINGS

FIG. 11 is an explanatory diagram of a correction value table of cyan.

DESCRIPTION OF EXEMPLARY EMBODIMENTS

Figure 1:
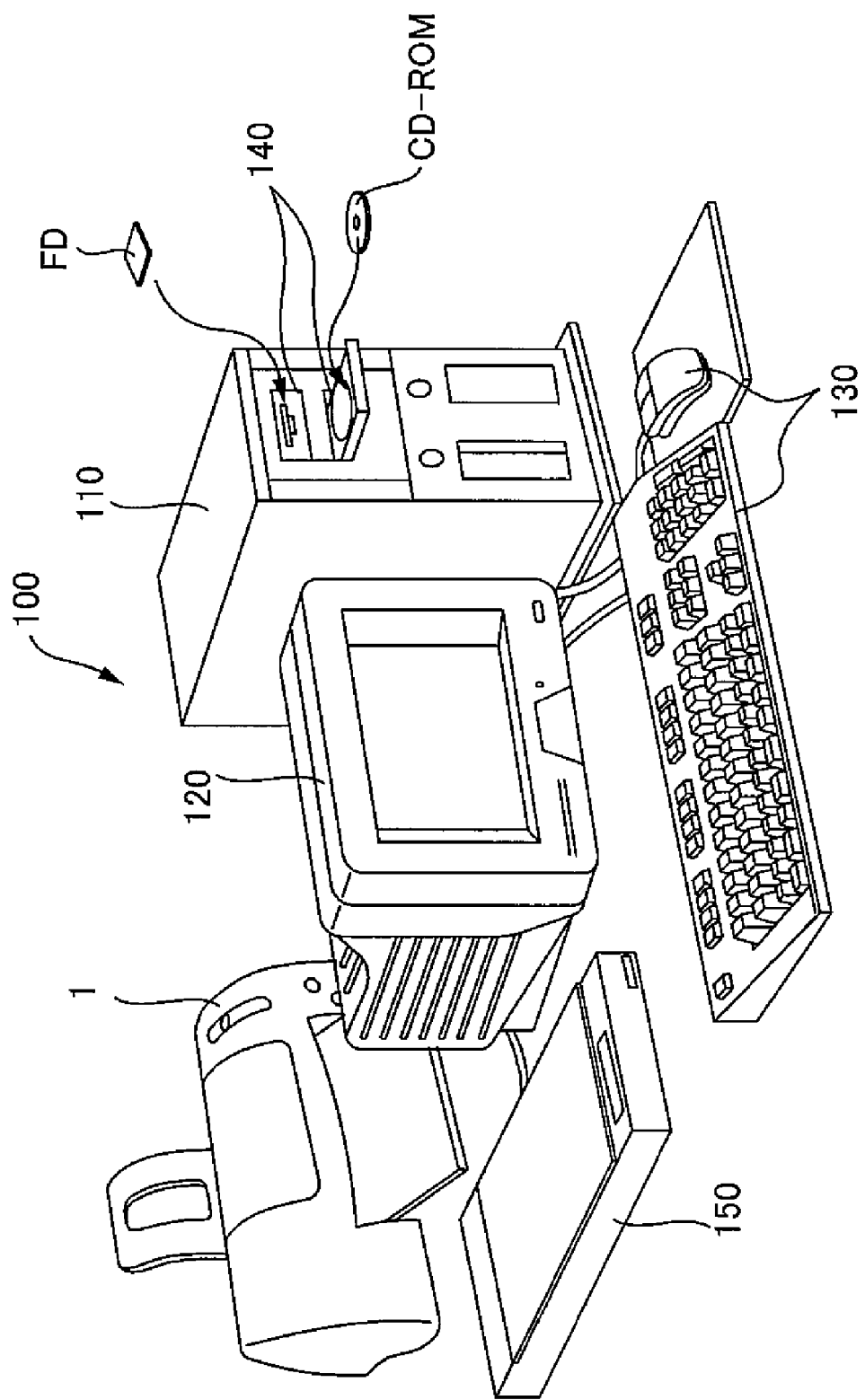
FIG. 1 is a diagram explaining the external configuration of a printing system.

At least the following matters will become clear through the description of the present specification and the accompanying drawings.

A correction value setting method including: generating, based on a first correction value that has been set in advance and is used in correcting a density of an image to be printed on a first medium, a second correction value that has a larger correction amount than the first correction value and a third correction value that has a smaller correction amount than the first correction value; printing respectively a first pattern to which the first correction value is applied, a second pattern to which the second correction value is applied, and a third pattern to which the third correction value is applied, on a second medium that differs in type from the first medium, by ejecting liquid from a head including a plurality of nozzles that eject liquid; and setting, based on the first pattern, the second pattern, and the third pattern that have been printed on the second medium, one of the first correction value, the second correction value, and the third correction value, as a correction value used in correcting a density of an image to be printed on the second medium.

With this correction value setting method, it is possible to appropriately and easily suppress density unevenness of an image printed on a medium of an unknown type (second medium).

In such a correction value setting method, it is preferable that density tone values of the first pattern, the second pattern, and the third pattern be density tone values obtained by applying the first correction value, the second correction value, and the third correction value respectively to a same middle tone value.

In such case, since there is no need to print the pattern for various tone values before correction, the number of patterns to be printed can be reduced. As a result, it is possible to set the correction values for the second medium quickly.

In such a correction value setting method, it is preferable that a maximum ejection amount of liquid that can be ejected per unit area of the second medium be closest to a maximum ejection amount of the first medium, of maximum ejection amounts of a plurality of media which a correction value used in correcting a density of an image to be printed on is set in advance.

Since the maximum ejection amounts of the first medium and the second medium are close to each other, and the state of dot formation of two media become also similar. Therefore, a correction value that is set based on the first correction value of the first medium is appropriate to the second medium. As a result, the correction value for the second medium can be set with high precision.

In such a correction value setting method, it is preferable that in the case of the setting of the correction value used in correcting the density of the image to be printed on the second medium, a density of each of the first pattern, the second pattern, and the third pattern be measured by a measurement device; that among the three measured patterns, a pattern a measured density of which has the smallest range of fluctuation be selected; and that the correction value corresponding to the selected pattern be set as the correction value corresponding to the second medium.

In such case, since selecting the pattern based on the values measured by the scanner enables the correction value to be selected with high precision, the optimum correction value for the second medium can be set.

In such a correction value setting method, it is preferable that in the case of the setting of the correction value used in correcting the density of the image to be printed on the second medium, the correction value corresponding to a pattern that is visually selected, among the first pattern, the second pattern, and the third pattern, as a pattern having the smallest degree of density unevenness be set as the correction value corresponding to the second medium.

In such case, since visually selecting the pattern enables the correction value to be selected in a simple way, a correction value setting method in which it is possible to easily set the correction value corresponding to the second medium can be realized.

A liquid ejecting apparatus including: a head including a plurality of nozzles that eject liquid; and a controller that generates, based on a first correction value that has been set in advance and is used in correcting a density of an image to be printed on a first medium, a second correction value that has a larger correction amount than the first correction value and a third correction value that has a smaller correction amount than the first correction value, that prints respectively a first pattern to which the first correction value is applied, a second pattern to which the second correction value is applied, and a third pattern to which the third correction value is applied, on a second medium that differs in type from the first medium, by ejecting liquid from the head, and that sets, based on the first pattern, the second pattern, and the third pattern that have been printed on the second medium, one of the first correction value, the second correction value, and the third correction value, as a correction value used in correcting a density of an image to be printed on the second medium.

With this liquid ejecting apparatus, it is possible to appropriately and easily suppress density unevenness of an image printed on a medium of an unknown type (second medium).

A printing system including a head including a plurality of nozzles that eject liquid; and a controller that generates, based on a first correction value that has been set in advance and is used in correcting a density of an image to be printed on a first medium, a second correction value that has a larger correction amount than the first correction value and a third correction value that has a smaller correction amount than the first correction value, that prints respectively a first pattern to which the first correction value is applied, a second pattern to which the second correction value is applied, and a third pattern to which the third correction value is applied, on a second medium that differs in type from the first medium, by ejecting liquid from the head, and that sets, based on the first pattern, the second pattern, and the third pattern that have been printed on the second medium, one of the first correction value, the second correction value, and the third correction value, as a correction value used in correcting a density of an image to be printed on the second medium.

With this printing system, it is possible to appropriately and easily suppress density unevenness of an image printed on a medium of an unknown type (second medium).

A storage medium having a program stored thereon, the program including, enabling a liquid ejecting apparatus to realize a function of generating, based on a first correction value that has been set in advance and is used in correcting a density of an image to be printed on a first medium, a second correction value that has a larger correction amount than the first correction value and a third correction value that has a smaller correction amount than the first correction value; a function of printing respectively a first pattern to which the first correction value is applied, a second pattern to which the second correction value is applied, and a third pattern to which the third correction value is applied, on a second medium that differs in type from the first medium, by ejecting liquid from a head including a plurality of nozzles that eject liquid; and a function of setting, based on the first pattern, the second pattern, and the third pattern that have been printed on the second medium, one of the first correction value, the second correction value, and the third correction value, as a correction value used in correcting a density of an image to be printed on the second medium.

With this program, it is possible to appropriately and easily suppress density unevenness of an image printed on a medium of an unknown type (second medium).

Overview of Printing System

The configuration of a printing system 100 and the like is explained.

FIG. 1 is a diagram explaining the external configuration of a printing system. The printing system 100 includes a printer 1 as an example of liquid ejecting apparatuses, a computer 110, a display device 120, an input device 130, a record/play device 140, and a scanner 150 as an example of measuring devices. The printer 1 is a printing apparatus that prints images on media such as paper, cloth, and film. The computer 110 is communicably connected to the printer 1. To make the printer 1 print an image, the computer 110 outputs print data corresponding to an image to be printed to the printer 1.

A printer driver is installed on the computer 110. The printer driver is a program that displays a user interface window on the display device 120, and converts image data outputted from an application program into print data. The printer driver is stored in a storage medium such as FD or CD-ROM (a storage medium readable by the computer). Also the printer driver can be downloaded to the computer 110 via the Internet. This program includes codes for realizing various functions.

Printer Driver

Figure 2:
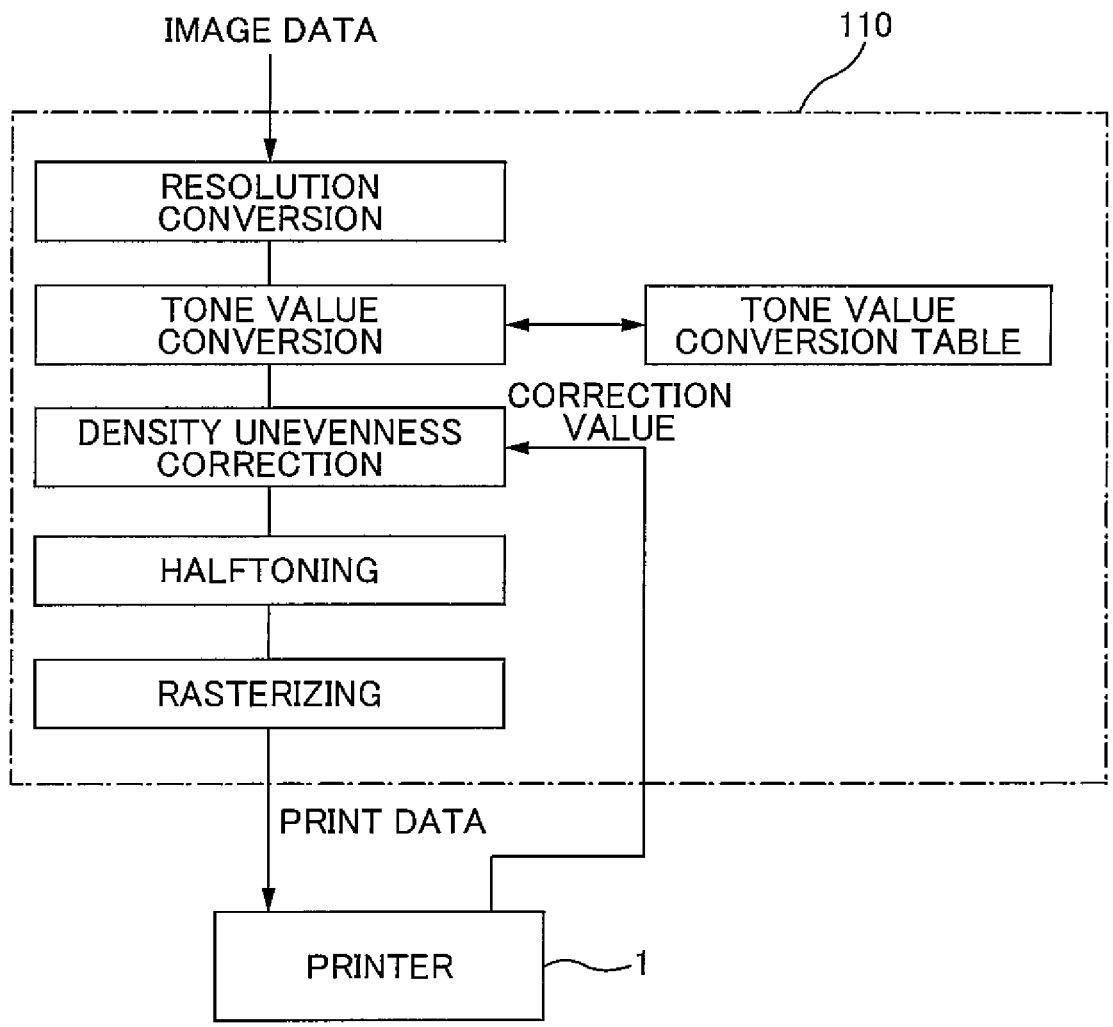
FIG. 2 is an explanatory diagram of image processing by a printer driver.

FIG. 2 is an explanatory diagram of image processing by the printer driver.

When receiving a print command from a user, the printer driver performs resolution conversion, tone value conversion, density unevenness correction, halftoning, and rasterizing. BRS correction values described later are used in the density unevenness correction. These processes are described hereafter.

The resolution conversion is a process in which image data (such as text data and picture data) outputted from the application program is converted into image data having a resolution for printing on paper. For example, in the case where the resolution for printing an image on paper has been specified as 360×360 dpi, then the image data received from the application program is converted to image data having a resolution of 360×360 dpi (the image data in this embodiment is CMYK data of 256 tones expressed using the CMYK color space).

The tone value conversion is a process in which tone values of image data in CMYK color space are converted based on a tone-value conversion table (described later on). By the tone value conversion, the tone values are converted considering degree of ink spread on paper (described in detail later on).

The density unevenness correction is a process in which the tone value of each pixel data constituting the image data is corrected based on correction values corresponding to a row region to which the pixel data belongs (specifically, the BRS correction values described hereafter). By the density unevenness correction, with respect to a row region that tends to be recognized dark, the tone value of the pixel data (CMYK data) of a pixel corresponding to that row region is corrected to a lower value. On the other hand, with respect to a row region that tends to be recognized light, the tone value of the pixel data of a pixel corresponding to that row region is corrected to a higher value. It should be noted that the printer driver performs a similar correction with respect to the other row regions of other colors as well.

The halftoning is a process for converting data having a large number of tone levels into data having a number of tone levels that can be formed by a printer. For example, through the halftoning, data indicating 256 tone levels is converted into one-bit data indicating two tone levels or two-bit data indicating four tone levels. In the halftoning, dithering, error diffusion and so forth are used to create pixel data such that the printer can form dots in a dispersed manner. Data subjected to the halftoning has the same resolution (for example, 360×360 dpi) as that of the CMYK data described above. Pixel data subjected to the halftoning indicates the state of dot formation. In the case where the pixel data subjected to the halftoning is two-bit data, that pixel data indicates no-dot, small-dot formation, medium-dot formation, or large-dot formation.

In this embodiment, the printer driver performs the halftoning with respect to pixel data whose tone value has been corrected through the density unevenness correction. As a result, with respect to a row region that tends to be recognized dark, the tone value of the pixel data in that row region is corrected to a lower value. Thus, the dot-generation rate of dots constituting the raster line in that row region decreases. On the other hand, the dot-generation rate increases with respect to a row region that tends to be recognized light.

The rasterizing is a process in which the order of image data in a matrix form is rearranged into the order of transmission to the printer. Data subjected to the rasterizing is outputted to the printer as the pixel data included in print data.

Configuration of Printer

Configuration of Inkjet Printer

Figure 3:
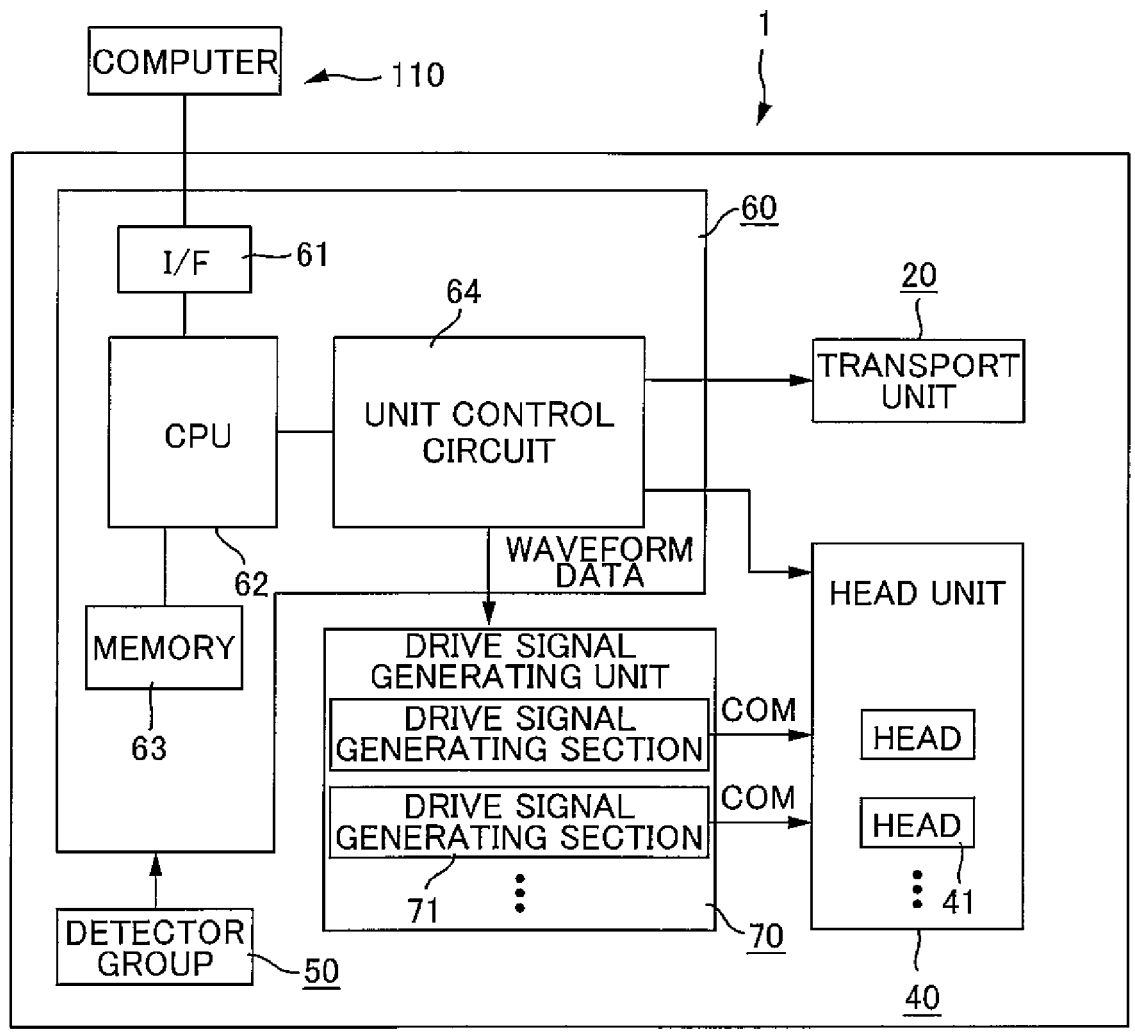
FIG. 3 is a block diagram of the overall configuration of a printer 1.
Figure 4A:
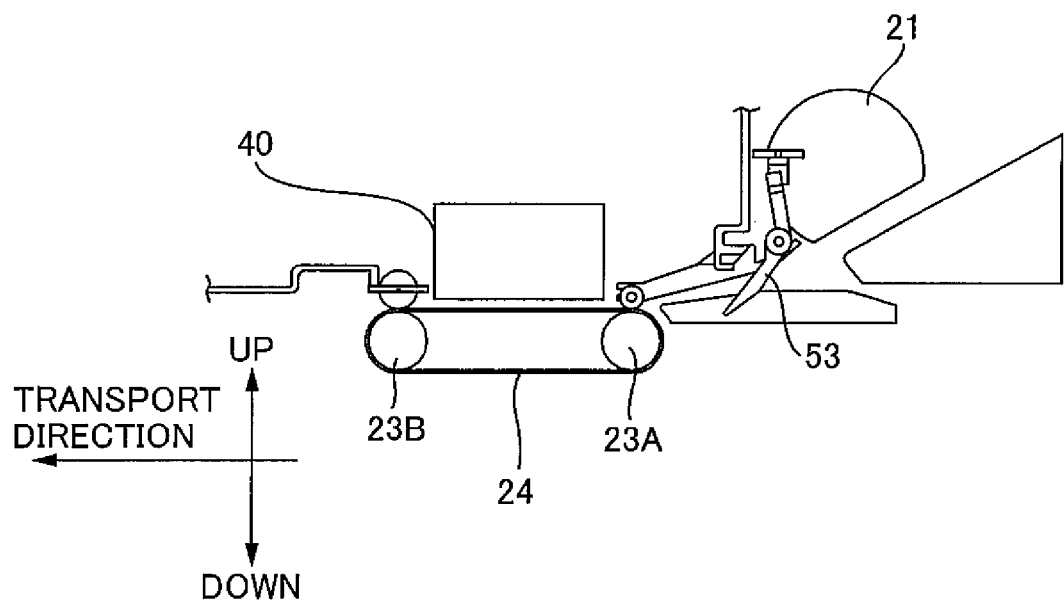
FIG. 4A is a cross-sectional view of the printer 1.
Figure 4B:
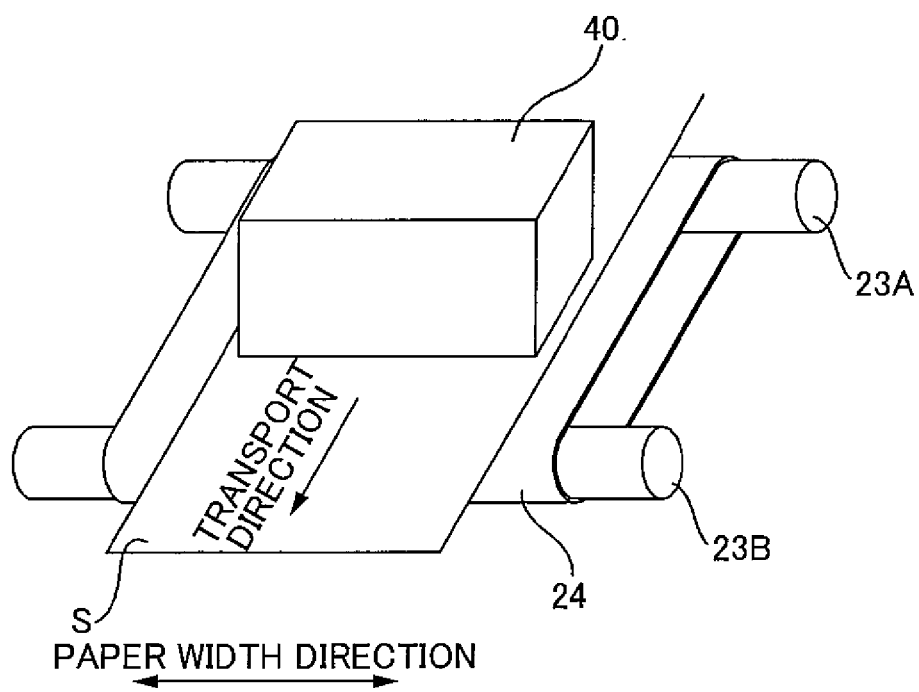
FIG. 4B is a perspective view for describing transport process and dot formation process of the printer 1.

FIG. 3 is a block diagram of the overall configuration of the printer 1. FIG. 4A is a cross-sectional view of the printer 1. FIG. 4B is a perspective view for describing transport process and dot formation process of the printer 1. Hereinafter the basic configuration of a line printer, the printer of this embodiment, is described.

The printer 1 includes a transport unit 20, a head unit 40, a detector group 50, a controller 60, and a drive signal generating unit 70. The printer 1, upon having received print data from the computer 110, which is an external device, controls various units (the transport unit 20, the head unit 40, and the drive signal generating unit 70) using the controller 60. The controller 60 controls the units based on the print data received from the computer 110 to print an image on paper. The detector group 50 monitors conditions within the printer 1, and outputs detection results to the controller 60. The controller 60 controls the units based on the detection results outputted from the detector group 50.

The transport unit 20 is for transporting a medium (such as paper S) in a predetermined direction (hereinafter, referred to as transport direction). The transport unit 20 includes a paper supply roller 21, a transport motor (not shown), an upstream-side transport roller 23A, a downstream-side transport roller 23B, and a belt 24. The paper supply roller 21 is a roller for supplying paper that has been inserted into a paper insert opening into the printer. When the transport motor not shown rotates, the upstream-side transport roller 23A and the downstream-side transport roller 23B rotate, and the belt 24 rotates. The paper S that has been supplied by the paper supply roller 21 is transported up to a printable region (region opposing the head) by the belt 24. The belt 24 transports the paper S, and the paper S moves in the transport direction with respect to the head unit 40. After passing the printable region the paper S is discharged outside by the belt 24. While being transported, the paper S is subjected to electrostatic adsorption or vacuum adsorption with respect to the belt 24.

The head unit 40 is for ejecting ink, which is an example of liquid, onto paper S. By ejecting ink to the paper S that is being transported, the head unit 40 forms dots on the paper S, and an image is printed on the paper S. The printer in this embodiment is a line printer, and the head unit 40 can form dots for paper width at once. The configuration of the head unit 40 is described later.

The detector group 50 includes a rotary encoder (not shown), a paper detection sensor 53 and the like. The rotary encoder detects a rotation amount of the upstream-side transport roller 23A and the downstream-side transport roller 23B. Based on the detection result of the rotary encoder, the transport amount of the paper S can be detected. The paper detection sensor 53 detects the position of a leading edge of the paper that is being supplied.

The controller 60 is a control unit (controller) for controlling the printer. The controller 60 includes an interface section 61, a CPU 62, a memory 63, and a unit control circuit 64. The interface section 61 exchanges data between the computer 110, which is an external device, and the printer 1. The CPU 62 is a processing unit for carrying out overall control of the printer. The memory 63 is for reserving a region for storing the programs for the CPU 62 and a working region, for instance, and includes a memory device such as a RAM or an EEPROM. The CPU 62 controls each unit via the unit control circuit 64 according to a program stored in the memory 63.

The drive signal generating unit 70 generates drive signals COM for driving the head unit 40. The drive signal generating unit 70 has a plurality of drive signal generating sections 71. When the controller 60 sets waveform data to each of the drive signal generating sections 71, the drive signal generating section 71 generates a drive signal COM having a waveform that corresponds to the waveform data. Corresponding to this drive signal COM, no dot is formed, or small-dot formation, medium-dot formation, or large-dot formation is performed.

Configuration of Head Unit 40

Figure 5A:
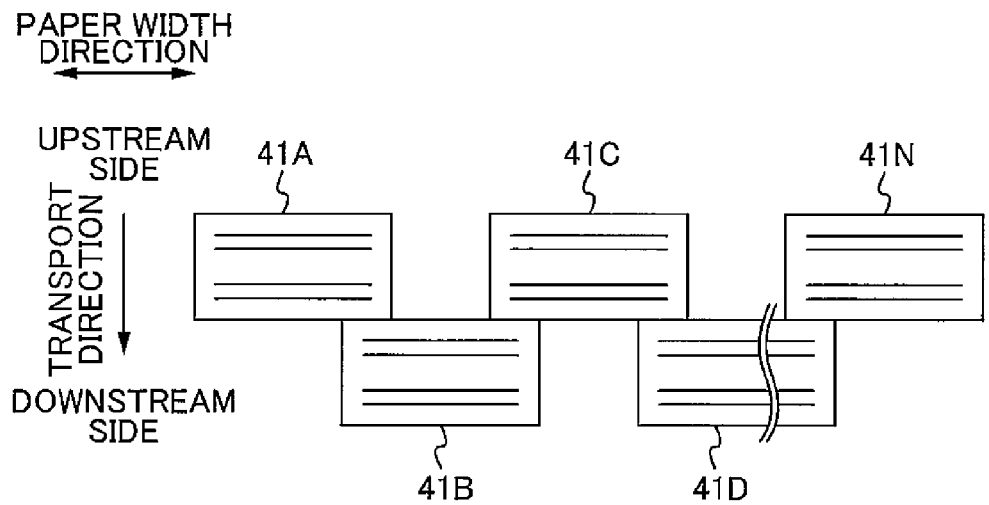
FIG. 5A is an explanatory diagram showing an arrangement of multiple heads in a lower surface of a head unit 40.
Figure 5B:
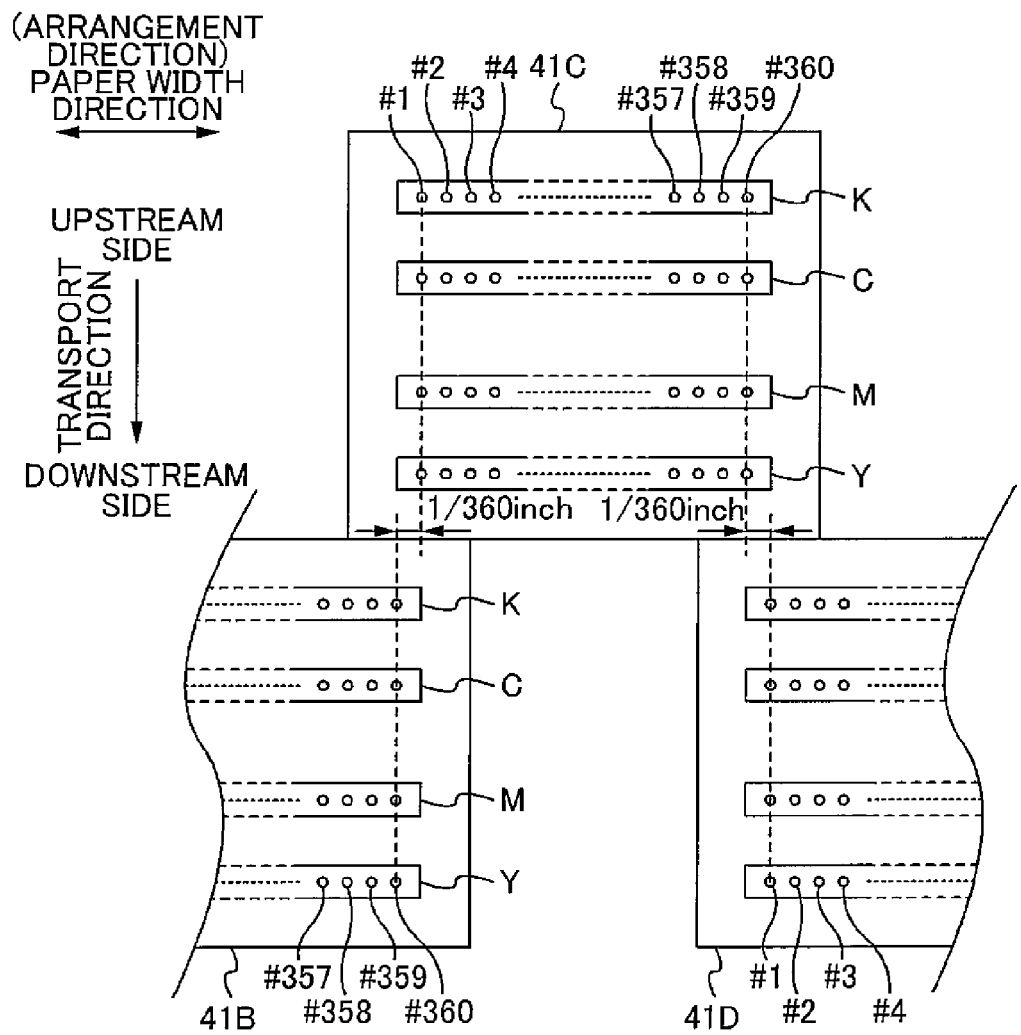
FIG. 5B is an explanatory diagram of the positional relationship between the heads.

FIG. 5A is an explanatory diagram showing an arrangement of multiple heads in a lower surface of the head unit 40. FIG. 5B is an explanatory diagram of the positional relationship between the heads. The lower surface of the head unit opposes the paper S transported by the belt 24.

On the lower surface of the head unit 40, the plurality of heads are arranged in a staggered arrangement. In the explanation below, starting from the left in FIG. 5A, the heads are referred to as a first head 41A, a second head 41B, a third head 41C, a fourth head 41D, . . . , and a n-th head 41N respectively. In the upstream side in the transport direction, the first head 41A, the third head 41C, the fifth head 41E, . . . , which are odd number heads are arranged in the paper width direction. In the downstream side in the transport direction, the second head 41B, the fourth head 41D, the sixth head 41F, . . . , which are even number heads are arranged in the paper width direction.

A black ink nozzle row K, a cyan ink nozzle row C, a magenta ink nozzle row M, and a yellow ink nozzle row Y are formed in each of the heads. Each nozzle row is provided with a plurality of nozzles that are ejection openings for ejecting ink (360 nozzles in this embodiment). The plurality of nozzles in each nozzle row are arranged in rows at a constant nozzle pitch in the arrangement direction in FIG. 5B (paper width direction). Here, the nozzle pitch is $1/360$ inch. Each nozzle of each of the heads is assigned a number (#1 to #360) starting from left in FIG. 5B. Each nozzle is provided with a pressure chamber containing ink (not shown) and a drive element (piezo element) for ejecting ink by changing the capacity of the pressure chamber.

The space in the paper width direction between nozzle #1 at the left end of an odd number head (for example the third head 41C) in the upstream side of the transport direction and nozzle #360 at the right end of an even number head (for example the second head 41B) in the downstream side of the transport direction is $1/360$ inch, the same as the nozzle pitch. Also, the space in the paper width direction between nozzle #360 at right end of odd number head (for example the third head 41C) in the upstream side of the transport direction and nozzle #1 at left end of even number head (for example the fourth head 41D) in the downstream side of the transport direction is same as the nozzle pitch which is $1/360$ inch.

By arranging the heads in this way, the nozzles can be arranged at $1/360$ inch spacing in the arrangement direction (paper width direction) for the width of the paper to be printed. And, by arranging the heads as such, the head unit 40 can form dots arranged at $1/360$ inch spacing (a dot row) in the paper width direction for the length of the paper width. Further, the length between nozzle #1 of the head 41A and nozzle #360 of the head 41N is smaller than the width of the paper to be printed, and an image is printed within the paper width.

Surely, the configuration is possible in which the length between the nozzle #1 of the head 41A and the nozzle #360 of the head 41N is equal or larger than the width of the paper to be printed.

Density Unevenness

When printers perform printing, density unevenness occurs in an image. In this section, a cause of density unevenness that occurs in an image printed with monochrome printing is described, for convenience of explanation. In the case of multi-color printing, the cause of density unevenness described below occurs for each color.

In the explanation below, a "unit region" means a virtual rectangular region defined on a medium such as paper, the size and shape of which are determined depending on print resolution. For example, in case that the print resolution is specified as 360 dpi (in the arrangement direction)×360 dpi (in the transport direction), a unit region is a square region of approximately 70.56 μm×70.56 μm ($\approx 1/360$ inch×$1/360$ inch). If an ink droplet is ideally ejected, the ink droplet lands in the center of this unit region, then the ink droplet spreads on the medium, and a dot is formed in the unit region. It should be noted that a single unit region corresponds to a single pixel that constitutes the image data. Since each unit region corresponds to each pixel, pixel data of each pixel also corresponds to each unit region.

Furthermore, in the explanation below, a "row region" means a region consisting of a plurality of unit regions lined up in the transport direction of paper. For example, in the case where the print resolution is 360 dpi×360 dpi, the row region is a band-shaped region having a width of 70.56 μm ($\approx 1/360$ inch) in the arrangement direction. If ink droplets are ideally and intermittently ejected from a nozzle to paper being transported in the transport direction, a raster line is formed in this row region. In other words, each raster line is respectively formed by ink ejected from a single nozzle. One row region corresponds to a plurality of pixels lined up in the transport direction.

Figure 6A:
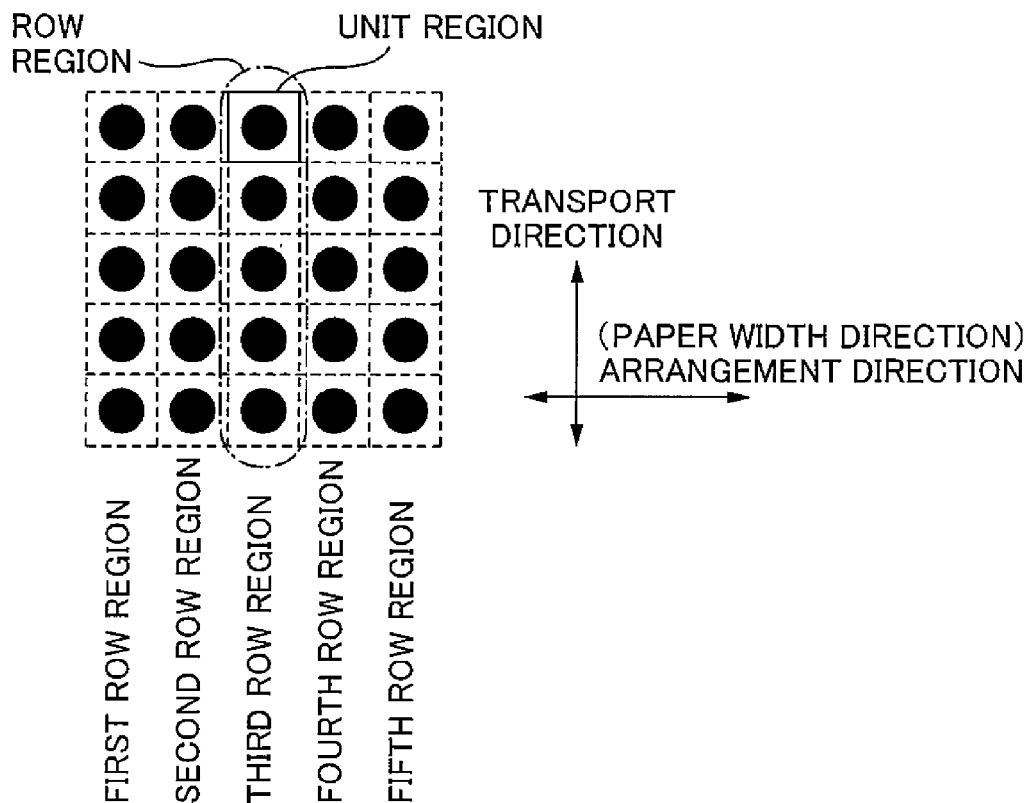
FIG. 6A is an explanatory diagram showing a state in which dots are formed ideally.

FIG. 6A is an explanatory diagram showing a state in which dots are formed ideally. In the figure, since dots are formed ideally, each dot is formed precisely in the unit region and each raster line is formed precisely in the row region. In the figure, in each row region, an image piece which has a density equivalent to the coloring of the region is formed. Here, for simplification of explanation, an image which has such a constant density that the dot-generation rate is 50% is printed.

Figure 6B:
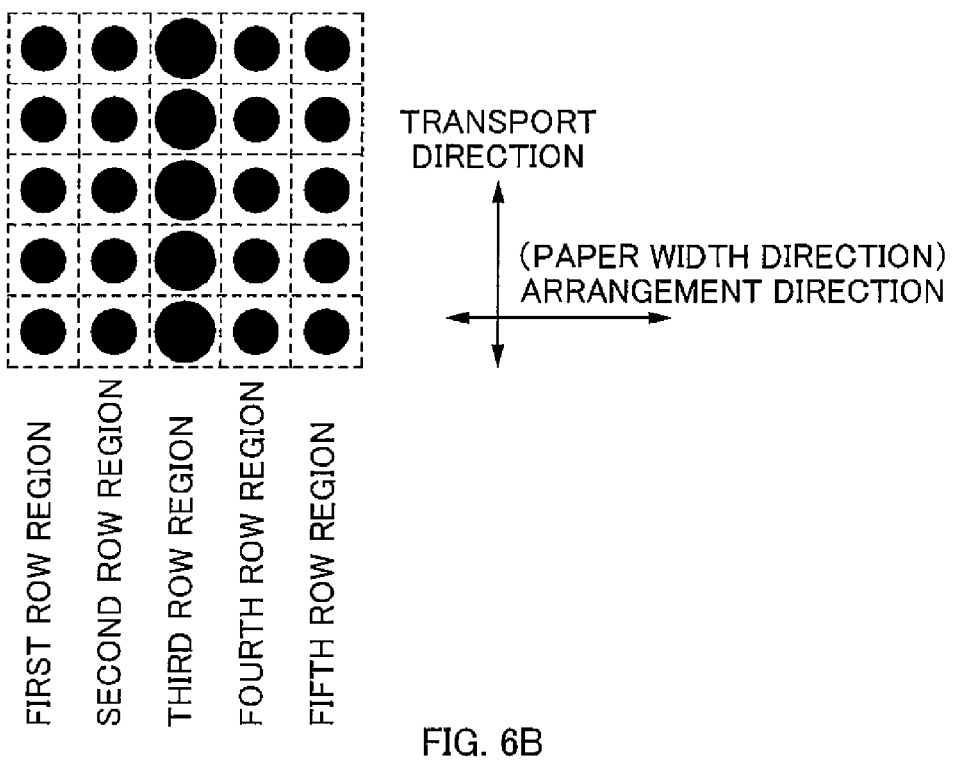
FIG. 6B is an explanatory diagram of density unevenness.

FIG. 6B is an explanatory diagram of density unevenness. Here, it is assumed that the diameter of a nozzle ejecting ink droplets to a third row region is larger than the diameter of a nozzle ejecting ink droplets to another row region. Thereby, the ink amount of an ink droplet ejected to the third row region increases and dots formed in the third row region become large. As a result, an image piece (raster line) in the third row region becomes darker in color than an image piece (raster line) in the other row region. Despite that, by definition, image pieces having the same density should be formed in each row region, a variation in density occur among image pieces depending on the row region. Accordingly, when macroscopically observing a printed image consisting of such raster lines, streaky density unevenness in the transport direction becomes visually noticeable. This density unevenness is a cause of making the print image quality deteriorate.

Thus, in the case of the line printer, density unevenness according to nozzle characteristics occurs.

Therefore, in this embodiment, to suppress the density unevenness according to nozzle characteristics described above, tone values of pixel data are corrected based on correction values that are each set for each row region (BRS correction values described hereafter). That is, with respect to a row region that tends to be recognized dark, the tone values of the pixel data (CMYK pixel data) of the pixels corresponding to that row region are corrected so that image pieces are each formed to be light. Also, with respect to a row region that tends to be recognized light, the tone values of the pixel data of the pixels corresponding to that row region are corrected so that the image piece is formed to be dark. For example, in FIG. 6B, the tone values of the pixel data of the pixels corresponding to the third row region are corrected so that the dot-generation rate of the third row region decrease. As a result, the dot-generation rate of the raster line in each row region is changed, and the density of the image piece in that row region is corrected, thereby suppressing density unevenness in the entire print image.

BRS Correction Value Acquisition Process

Figure 7:
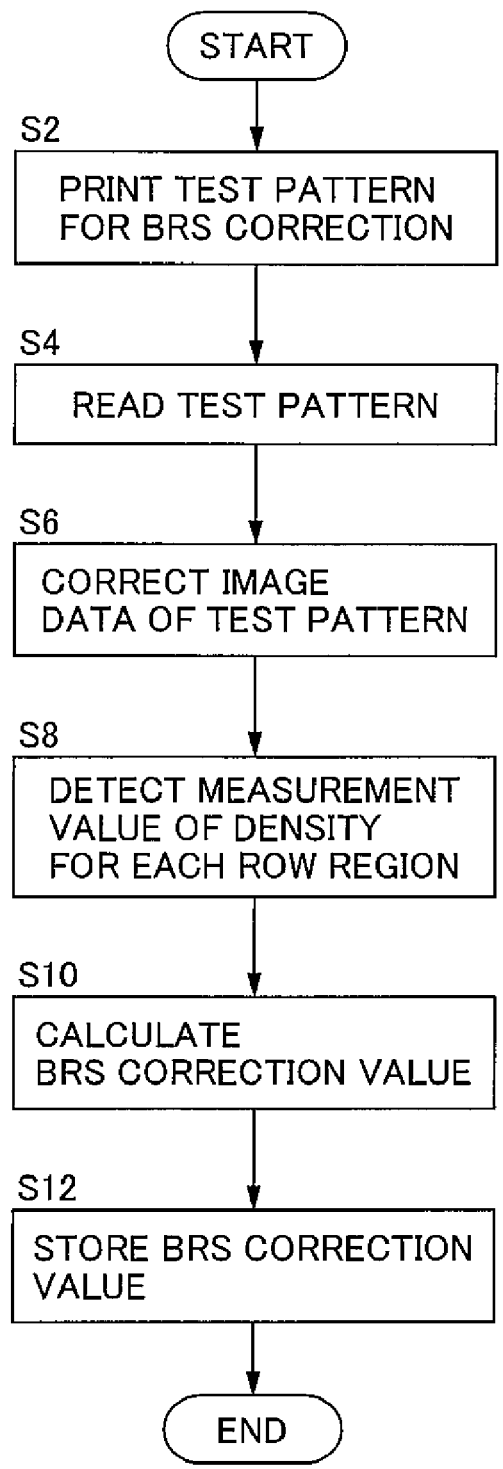
FIG. 7 is a flowchart of a BRS correction value acquisition process.

FIG. 7 is a flowchart of a BRS correction value acquisition process. BRS correction values are correction values for correcting density unevenness. Each step is performed by a program for BRS correction installed in the computer 110.

First, the computer 110 transmits print data to the printer 1, and the printer 1 prints a test pattern for BRS correction on a test sheet (step S2).

Figure 8:
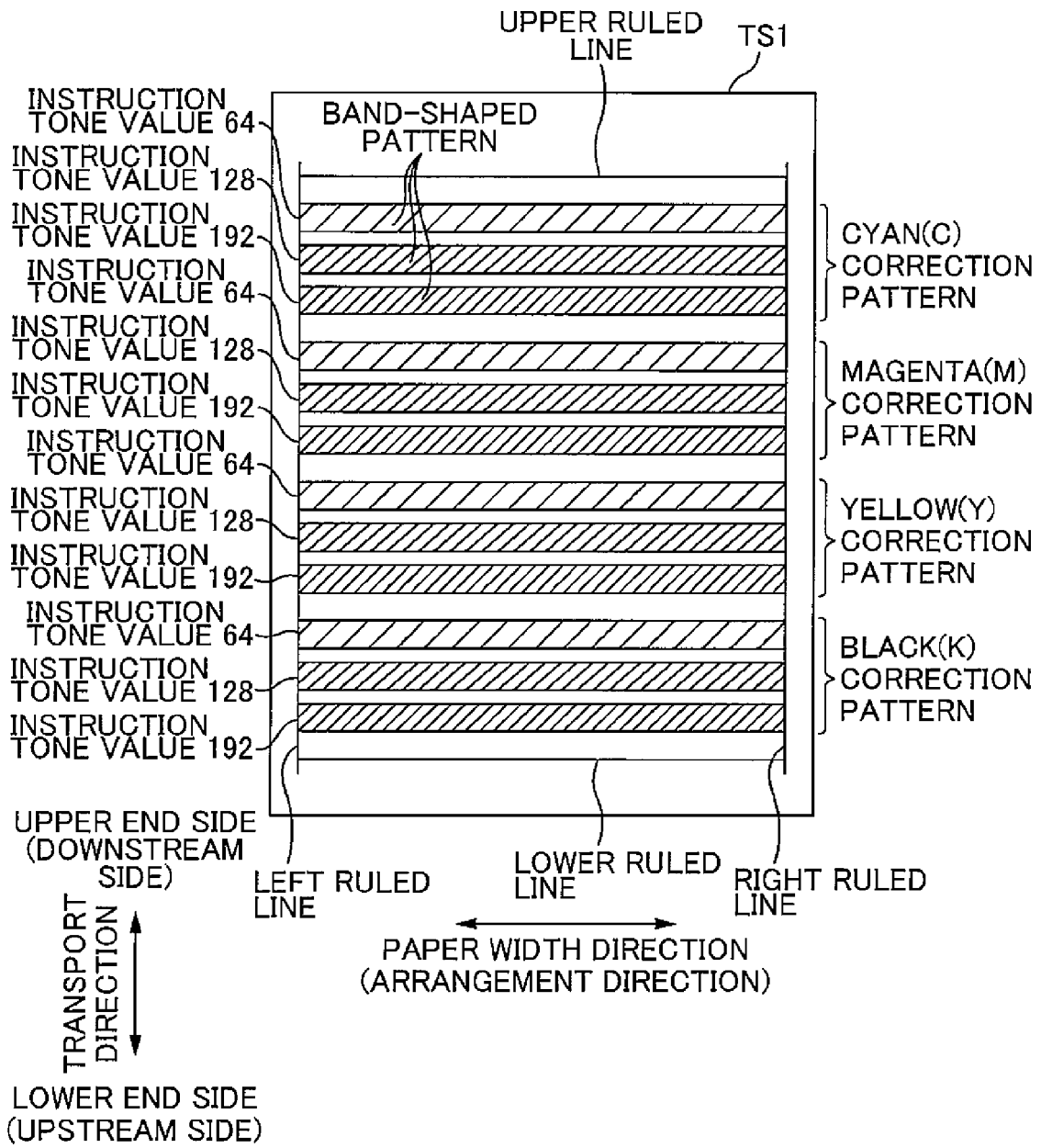
FIG. 8 is an explanatory diagram of a test pattern for BRS correction.

FIG. 8 is an explanatory diagram of the test pattern for BRS correction. The test pattern for BRS correction is printed in a test sheet TS1. The test pattern includes four correction patterns according to colors, an upper ruled line, a lower ruled line, a left ruled line, and a right ruled line. Each correction pattern consists of band-shaped patterns in three density levels. Each band-shaped pattern is formed by making all nozzles of each head 41 eject ink. Each band-shaped pattern is generated from image data of a constant tone value. Each correction pattern consists of, from the upper band-shaped pattern to the lower side, patterns of the tone value 64 (25% density), tone value 128 (50% density), and tone value 192 (75% density), with the density increasing in this order. It should be noted that these three types of tone values (densities) are referred to as "instruction tone values (instructed densities)", and are respectively expressed by symbols: Sa (=64) Sb (=128), and Sc (=192).

Next, an inspector sets the test sheet T1 on which the test pattern is printed on the scanner 150. Then, the computer 110 makes the scanner 150 read the test pattern and obtains image data of the test pattern (step S4).

Next, the computer 110 rectifies the image data of the test pattern (step S6). Thereby, deformation that occurs in the image because of an error in the reading position of the scanner 150 is rectified.

Next, the computer 110 detects measurement values of density for each row region, for each band-shaped pattern of the four correction patterns (step S8).

Figure 9:
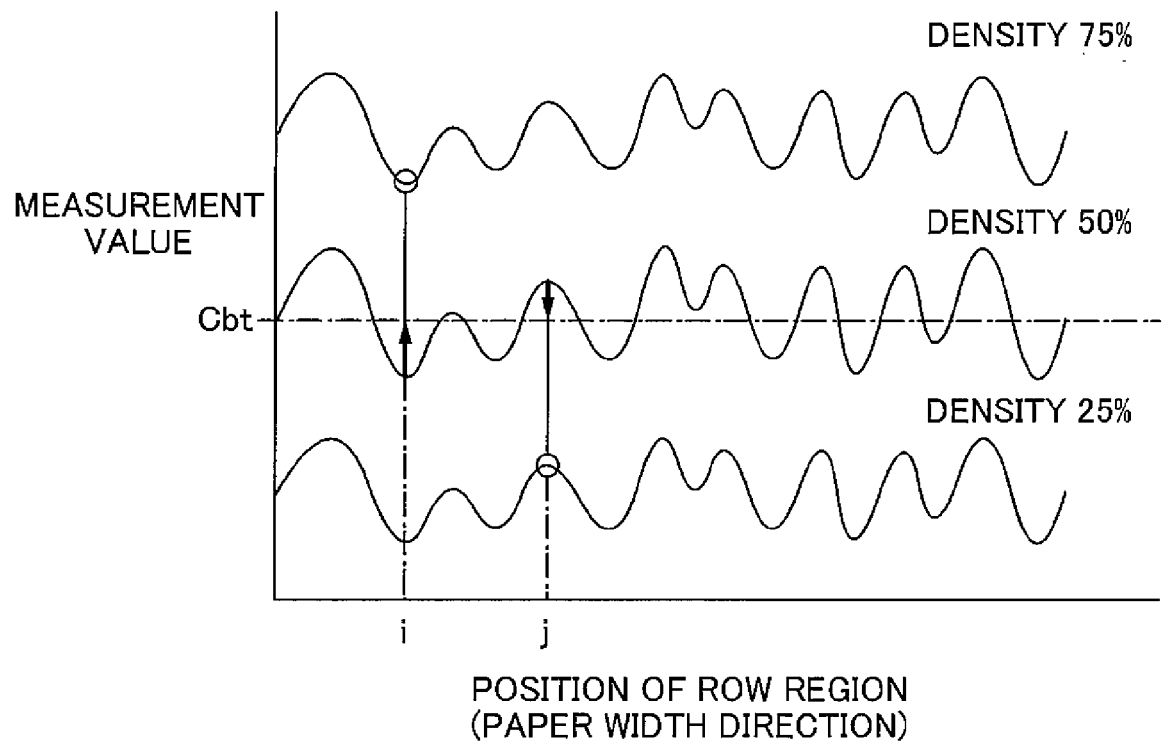
FIG. 9 is a graph showing measurement values of band-shaped patterns at 25% density, 50% density, and 75% density of cyan.

FIG. 9 is a graph showing measurement values of the band-shaped patterns at 25% density, 50% density, and 75% density of cyan. Even though the band-shaped patterns have been formed at their respective instruction tone values in a uniform manner, there are inconsistencies in density among row regions. These inconsistencies in density among row regions are cause of the density unevenness in a print image.

Next, the computer 110 calculates BRS correction values for each row region (step S10). Here, a process for making uniform the measurement values in the band-shaped pattern having the tone value Sb (50% density) will be discussed. In this example, the average value Cbt of the measurement values of all the row regions in the band-shaped pattern for the tone value Sb is defined as the target value for 50% density. As for a row region i whose measurement value is smaller (lighter) than the target value Cbt, it can be considered that correcting to make its tone value larger is suitable. On the other hand, as for a row region j whose measurement value is larger (darker) than the target value Cbt, it can be considered that correcting to make its tone value smaller is suitable.

Accordingly, the computer 110 calculates correction values for each row region. Here, an explanation will be given on a case in which a correction value for the instruction tone value Sb in a certain row region is calculated. As described below, the correction value of the row region i for the instruction tone value Sb (50% density) shown in FIG. 9 is calculated based on the measurement values for the tone value Sb and tone value Sc (75% density). On the other hand, the correction value of the row region j for the instruction tone value Sb is calculated based on the measurement values for the tone value Sb and tone value Sa (25% density).

Figure 10A:
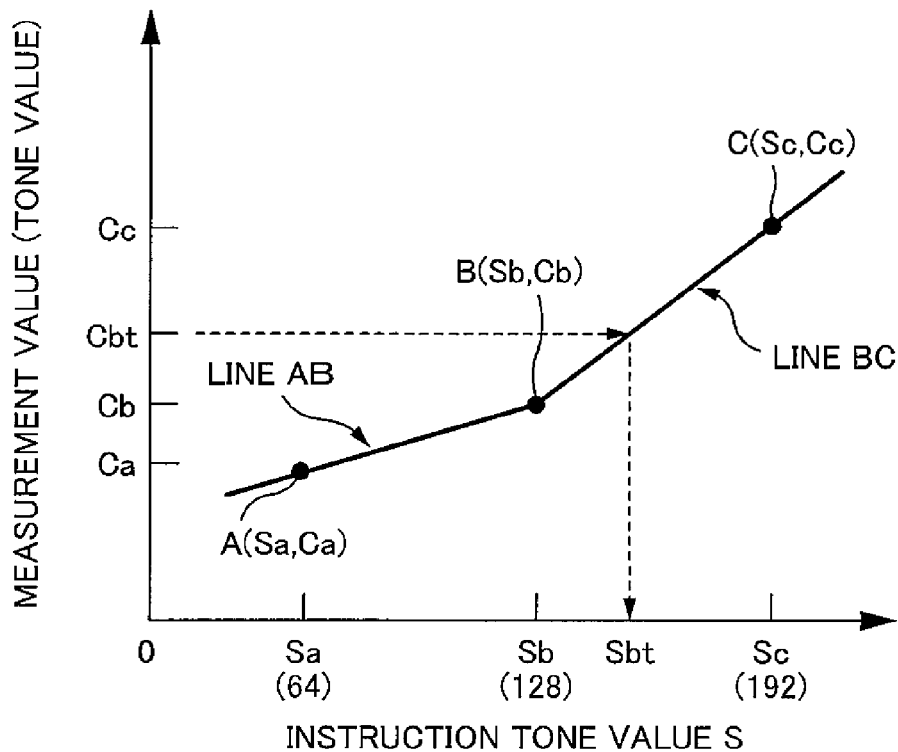
FIG. 10A is a diagram for describing a target instruction tone value Sbt for an instruction tone value Sb in a row region i.

FIG. 10A is a diagram for describing a target instruction tone value Sbt for the instruction tone value Sb in the row region i. In this row region i, the measurement value Cb of the density of the band-shaped pattern formed at the instruction tone value Sb indicates a tone value smaller than the target value Cbt (the density of this row region is lighter than the average density). If the printer is made to form a pattern of a density of the target value Cbt in this row region, then it would be suitable for the printer driver to give an instruction based on the target instruction tone value Sbt calculated according to the following expression (linear interpolation based on line BC).

$$Sbt = Sb + (Sc - Sb) \times \{(Cbt - Cb)/(Cc - Cb)\}$$

Figure 10B:
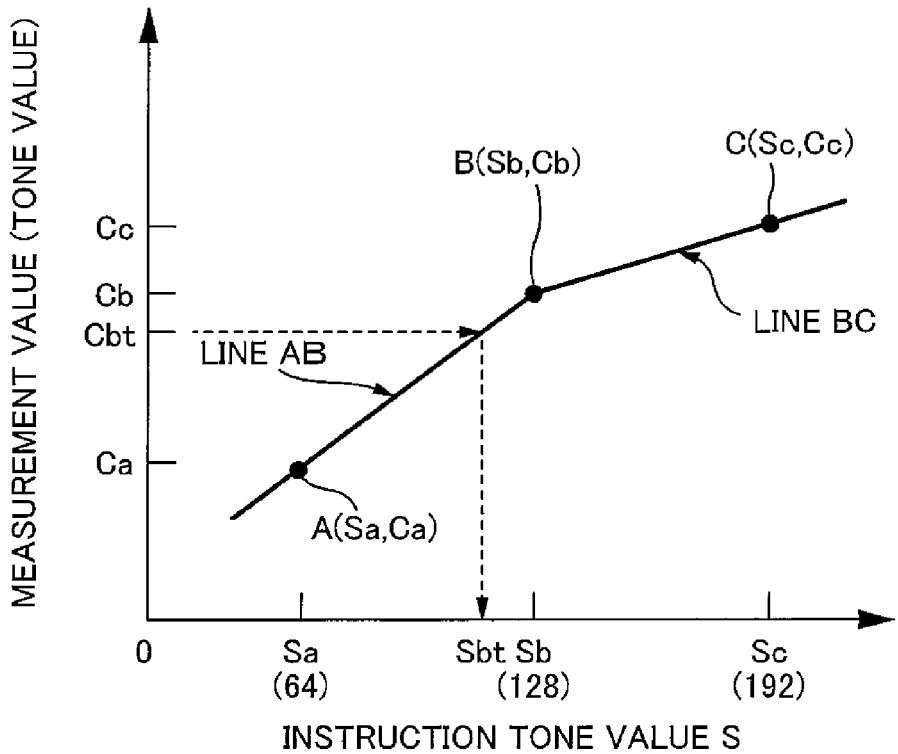
FIG. 10B is a diagram for describing a target instruction tone value Sbt for an instruction tone value Sb in a row region j.

FIG. 10B is a diagram for describing a target instruction tone value Sbt for the instruction tone value Sb in the row region j. In this row region j, the measured value Cb of the density of the band-shaped pattern formed at the instruction tone value Sb indicates a tone value larger than the target value Cbt (this row region is darker than the average density). If the printer is made to form a pattern of a density of the target value Cbt in this row region, then it would be suitable for the printer driver to give an instruction based on the target instruction tone value Sbt calculated according to the following expression (linear interpolation based on line BC).

$$Sbt = Sb - (Sb - Sa) \times \{(Cbt - Cb)/(Ca - Cb)\}$$

After calculating the target instruction tone value Sbt in this manner, the computer 110 calculates a correction value Hb for the instruction tone value Sb in that row region according to the following expression.

$$Hb = (Sbt - Sb)/Sb$$

The computer 110 calculates, for each row region, a correction value Hb for the tone value Sb (50% density). In the same way, the computer 110 calculates, for each row region, a correction value Hc for the tone value Sc (75% density), based on the measurement value Cc and the measurement value Cb for each row region. Further, in the same way, the computer 110 calculates, for each row region, a correction value Ha for the tone value Sa (25% density), based on the measurement value Ca and the measurement values Cb for each row region. For the other colors, the computer 110 also calculates three correction values (Ha, Hb, and Hc) for each row region.

Return to the flowchart in FIG. 7 and the explanation continues. The computer 110 transmits the correction data to the printer 1 and stores the BRS correction values in the memory 63 of the printer 1 (step S12).

FIG. 11 is an explanatory diagram of a correction value table of cyan. In the correction value table, three correction values (Ha, Hb, and Hc) are associated with each row region. For example, three correction values (Ha_n, Hb_n, and Hc_n) are associated with the n-th raster line of each row region. The three correction values (Ha_n, Hb_n, and Hc_n) correspond to the instruction tone values Sa (=64), Sb (=128), and Sc (=192), respectively. These BRS correction values reflect density unevenness characteristics of individual printers. It should be noted that the correction value tables for the other colors are configured in the same way.

The printer that stores the BRS correction values is packed and sent to a user. When user prints an image by the printer, the printer corrects the image data of the image to be printed based on the BRS correction values and performs printing based on the corrected image data. As a result, the dot-generation rate of the raster line in each row region is changed, and the density of the image piece in that row region is corrected, thereby suppressing the density unevenness according to nozzle characteristics in the entire print image.

Relationship between Paper Type and Image Density

The printer 1 can print image on various types of paper. For example, the printer 1 can print image on wood free paper, matte paper and gloss paper. The wood free paper is made with 100% chemical pulp. The matte paper and the gloss paper are wood free paper (or wood-containing paper) on whose surface a coating has been applied (coated). The matte paper is paper whose surface is processed so as to suppress gloss, and the gloss paper is paper whose surface is processed so as to put on gloss. As mentioned, three types of paper are different in processing conditions on their surface layers. Generally, of the wood free paper, matte paper, and gloss paper, the wood free paper is the thickest, the matte paper is the second thickest, and the gloss paper is the thinnest.

Because degree of ink absorption varies due to variation in the surface treatment and paper thickness described above, degree of ink spread varies according to each paper type.

Figure 12A:
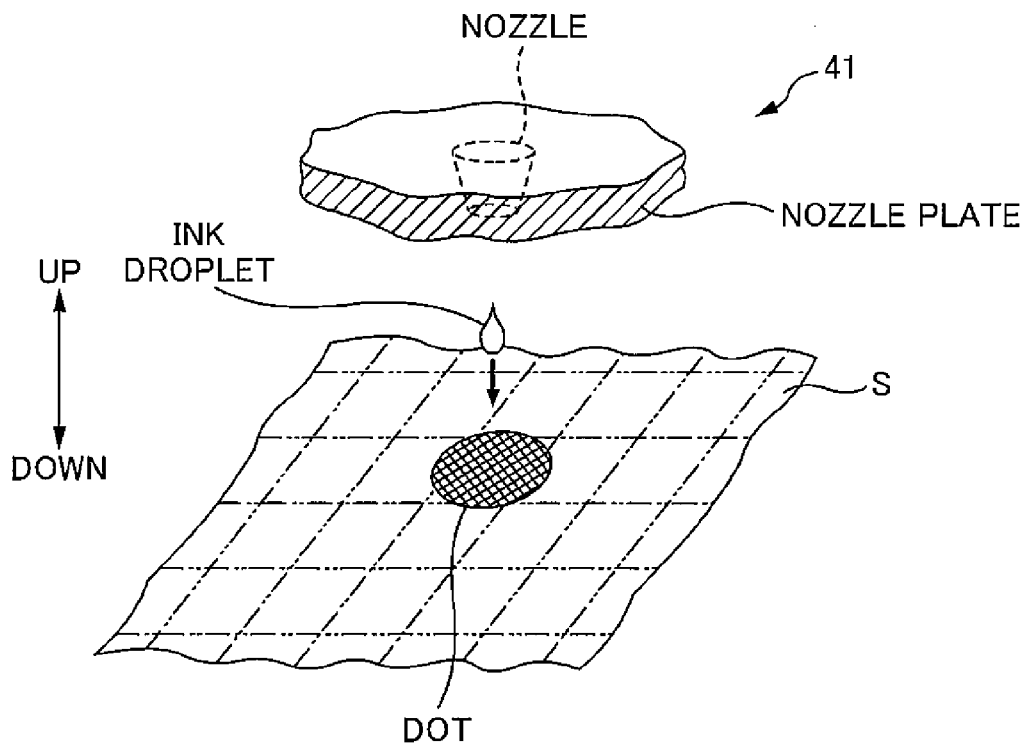
FIGS. 12A and 12B are diagrams for explaining the degree of ink spread on paper.
Figure 12B:
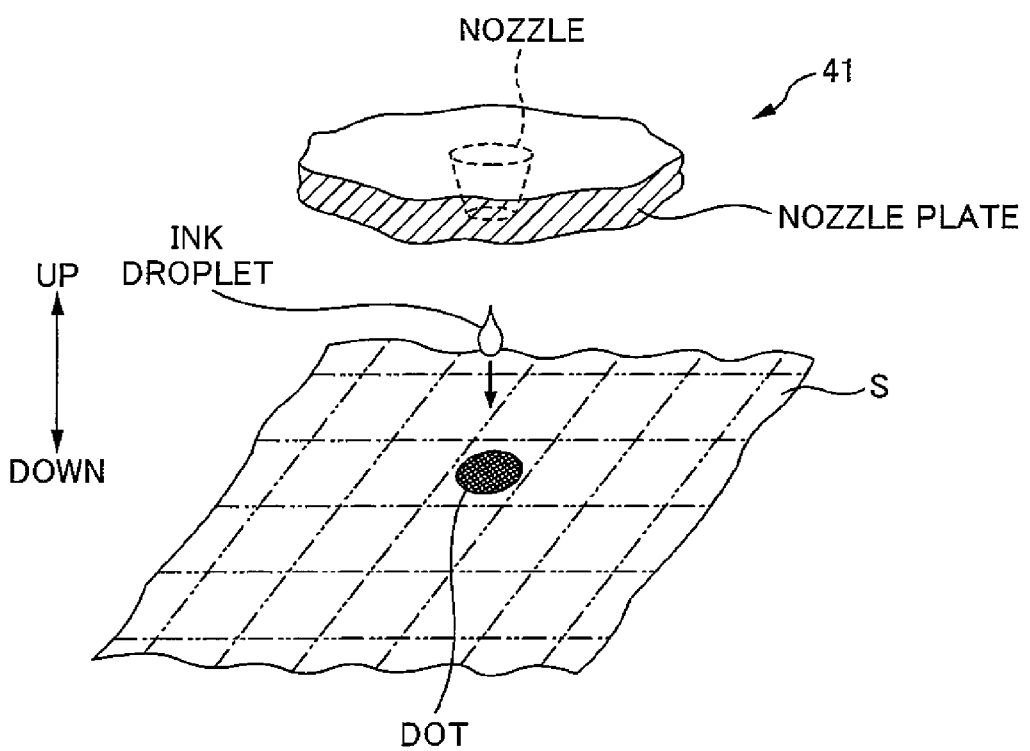

FIGS. 12A and 12B are diagrams for explaining the degree of ink spread on paper.

In FIG. 12A, the degree of ink absorption to paper is small. In FIG. 12B, the degree of ink absorption to paper is large. Therefore, a dot formed on the paper in FIG. 12A is large, and a dot formed on the paper in FIG. 12B is small even if an ink droplet of the same size is ejected from the nozzle to these two types of paper.

The nozzle may be made decentered because of the variation in precision of manufacturing among nozzles. An ink droplet ejected from the decentered nozzle flies obliquely with respect to paper, and therefore a landing position on the paper is displaced. Here, the landing position of the ink droplet is displaced in the arrangement direction (paper width direction).

Figure 13A:
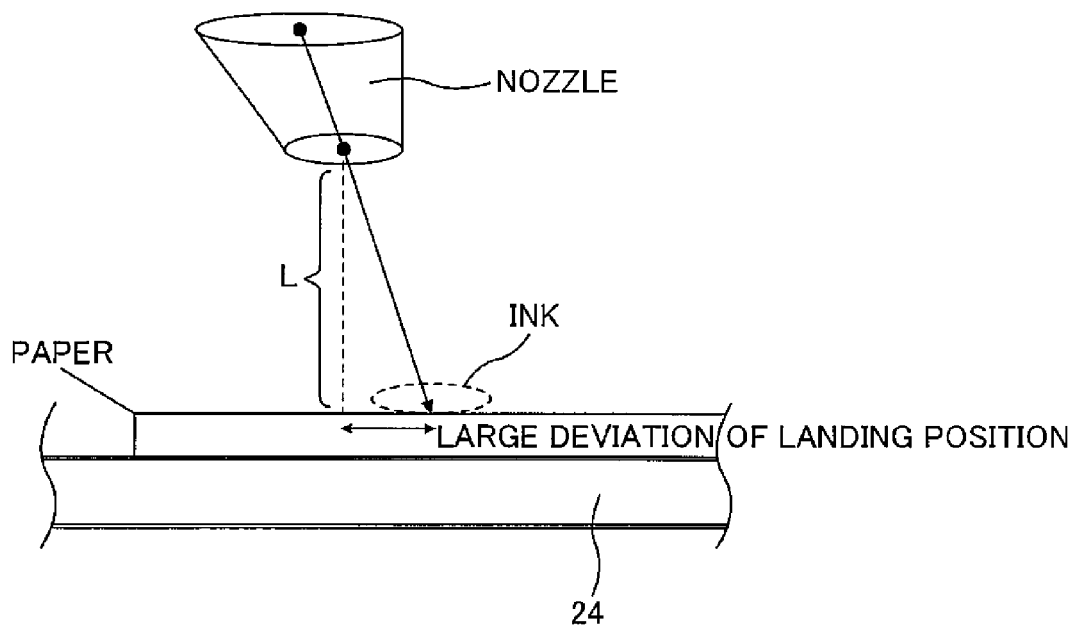
FIGS. 13A and 13B are schematic diagrams for explaining a relationship between paper thickness and a landing position of an ink droplet.
Figure 13B:
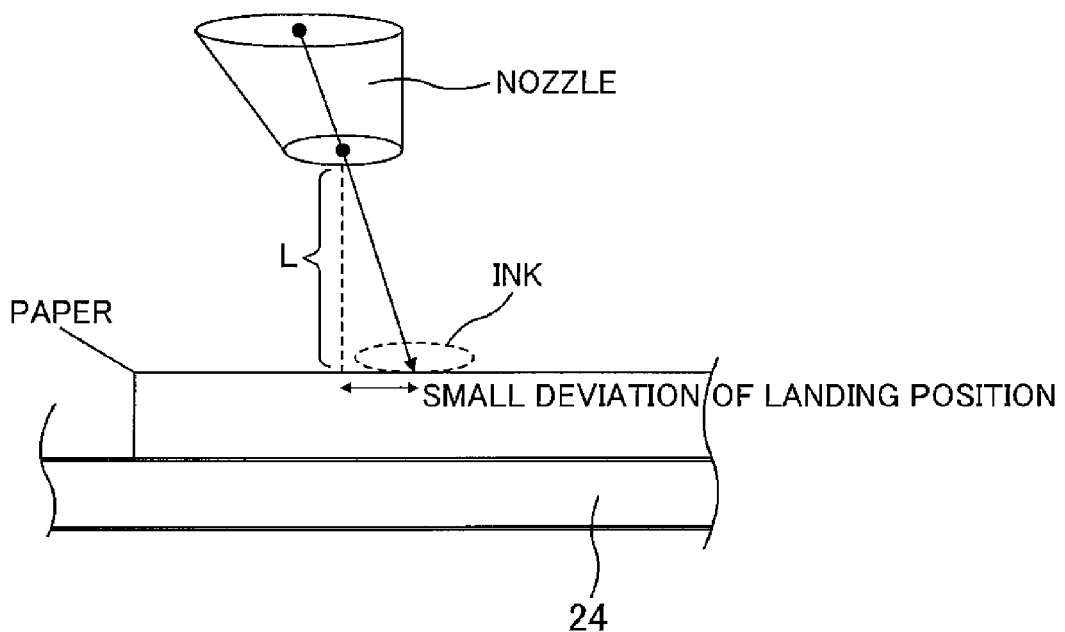

FIGS. 13A and 13B are schematic diagrams for explaining a relationship between paper thickness and the landing position of the ink. The paper in FIG. 13A is a thin paper and the paper in FIG. 13B is a thick paper. In such case, a gap L between the nozzle and the paper surface varies. That is, in case of the thick paper, the gap L is small, and in case of the thin paper, the gap L is large.

In such case, when the decentered nozzle ejects ink, the amount of deviation of the ink landing position on the thick paper becomes smaller than the amount of deviation of ink landing position on the thin paper. As a result, the degree of density unevenness of an image printed on the thick paper and the degree of density unevenness of an image printed on the thin paper become different.

By the way, the BRS correction values described above are obtained based on the pattern printed on a specific type of dedicated paper. Thus, for example, there is a possibility that the correction is not appropriate when the BRS correction values of the dedicated paper is applied to paper whose thickness is different from the thickness of the dedicated paper (paper of an unknown type).

BRS Correction Value Acquisition Process for Unknown Type Paper

As described above, to suppress density unevenness of an image to be printed on an unknown type of paper, the acquisition process of the BRS correction values corresponding to an unknown type of paper is performed as explained below.

Figure 14:
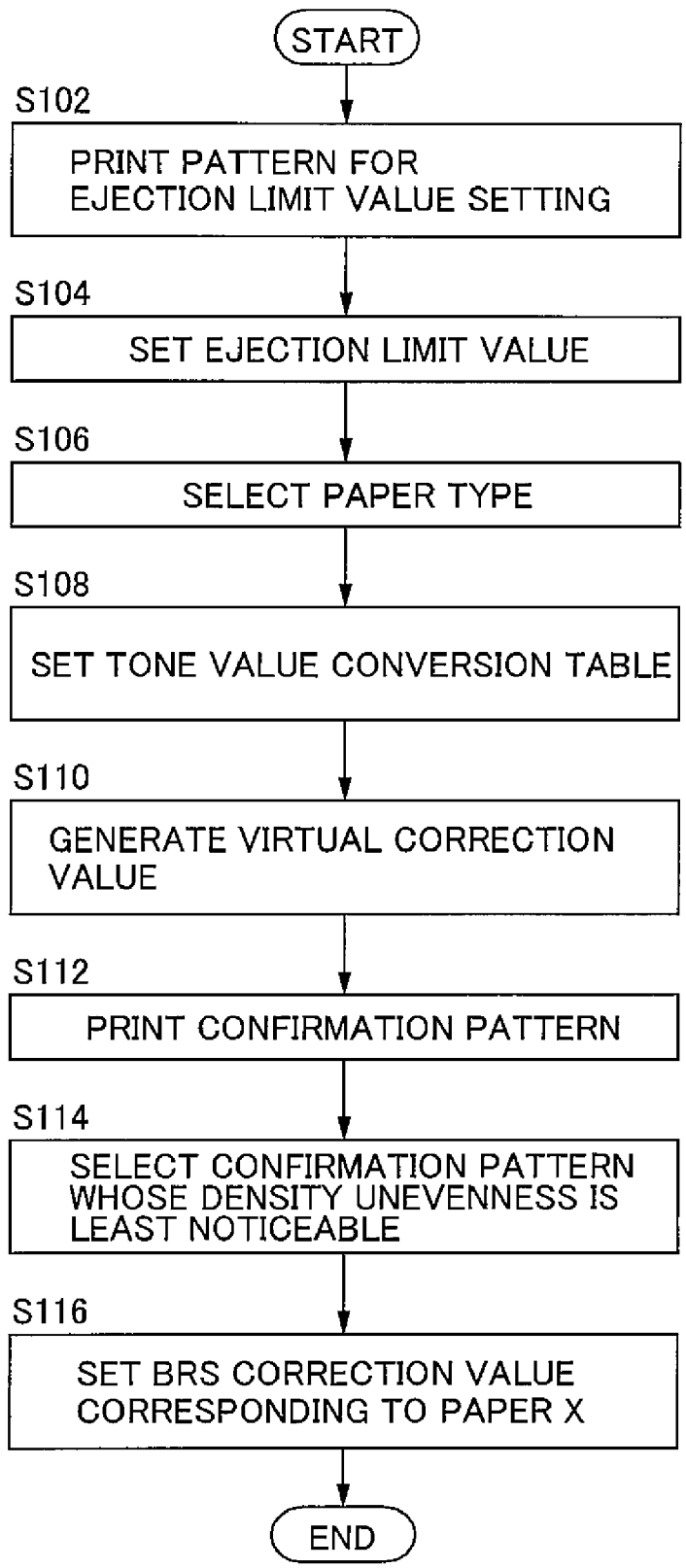
FIG. 14 is a flowchart of an acquisition process of BRS correction values corresponding to an unknown type of paper.

FIG. 14 is a flowchart of the acquisition process of the BRS correction values corresponding to an unknown type of paper. This flow starts before an image is printed on paper X whose type is unknown. Hereinafter, each step of the BRS correction value acquisition process is explained. Each step is realized by an acquisition program of the BRS correction values of an unknown paper installed in the computer 110 which is the control section.

Printing Pattern for Setting Ejection Limit Values (Step S102)

As forementioned, the degree of ink spread varies according to the paper types. In the case where the paper X of an unknown type is paper that is hard to absorb ink, the ink spread becomes noticeable when a dot of large tone value is formed, and image quality deteriorates. So as to check the degree of ink spread on the paper X, the computer 110 prints a pattern for setting ejection limit values on the paper X.

Figure 15:
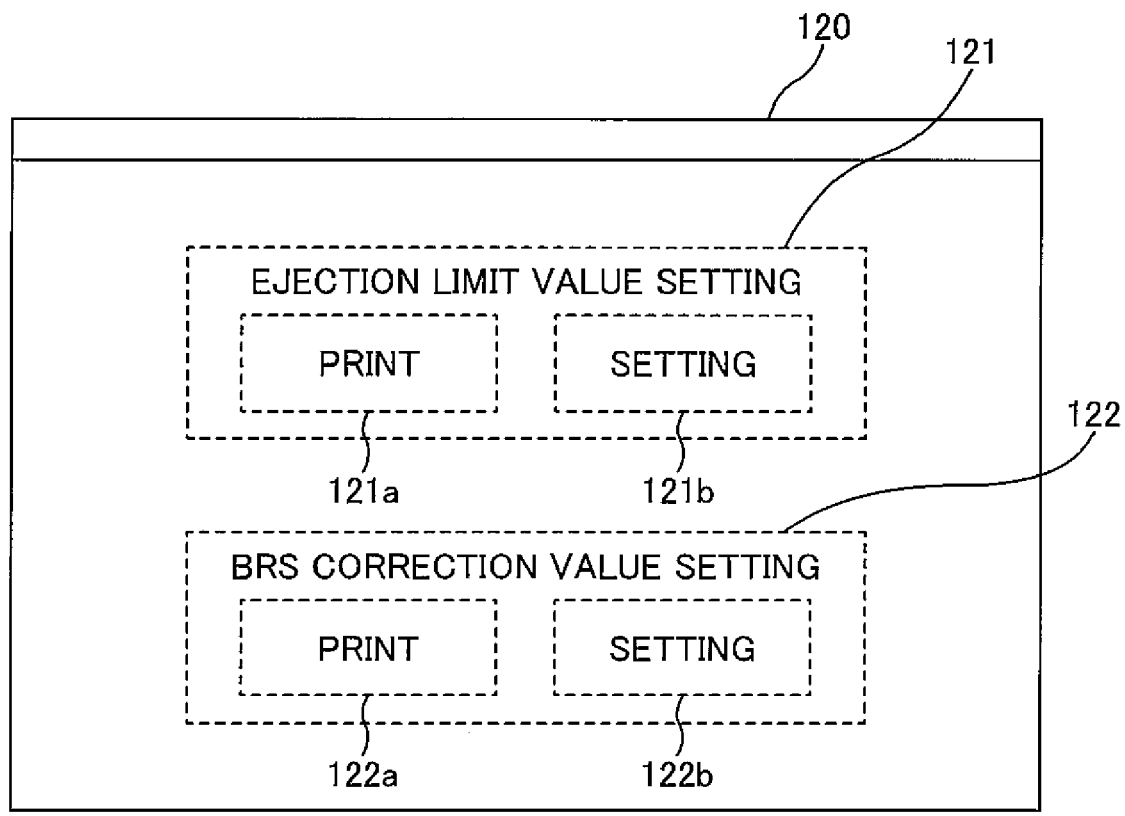
FIG. 15 is a diagram showing a user interface window.

FIG. 15 is a diagram showing the user interface window displayed in the display device 120. In the user interface window, an ejection-limit-value setting section 121 is included. By a user clicking a print button 121a of the ejection-limit-value setting section 121 by a mouse of the input device 130, the computer 110 makes the printer 1 print the pattern for setting the ejection limit values on a test sheet TS2.

Figure 16:
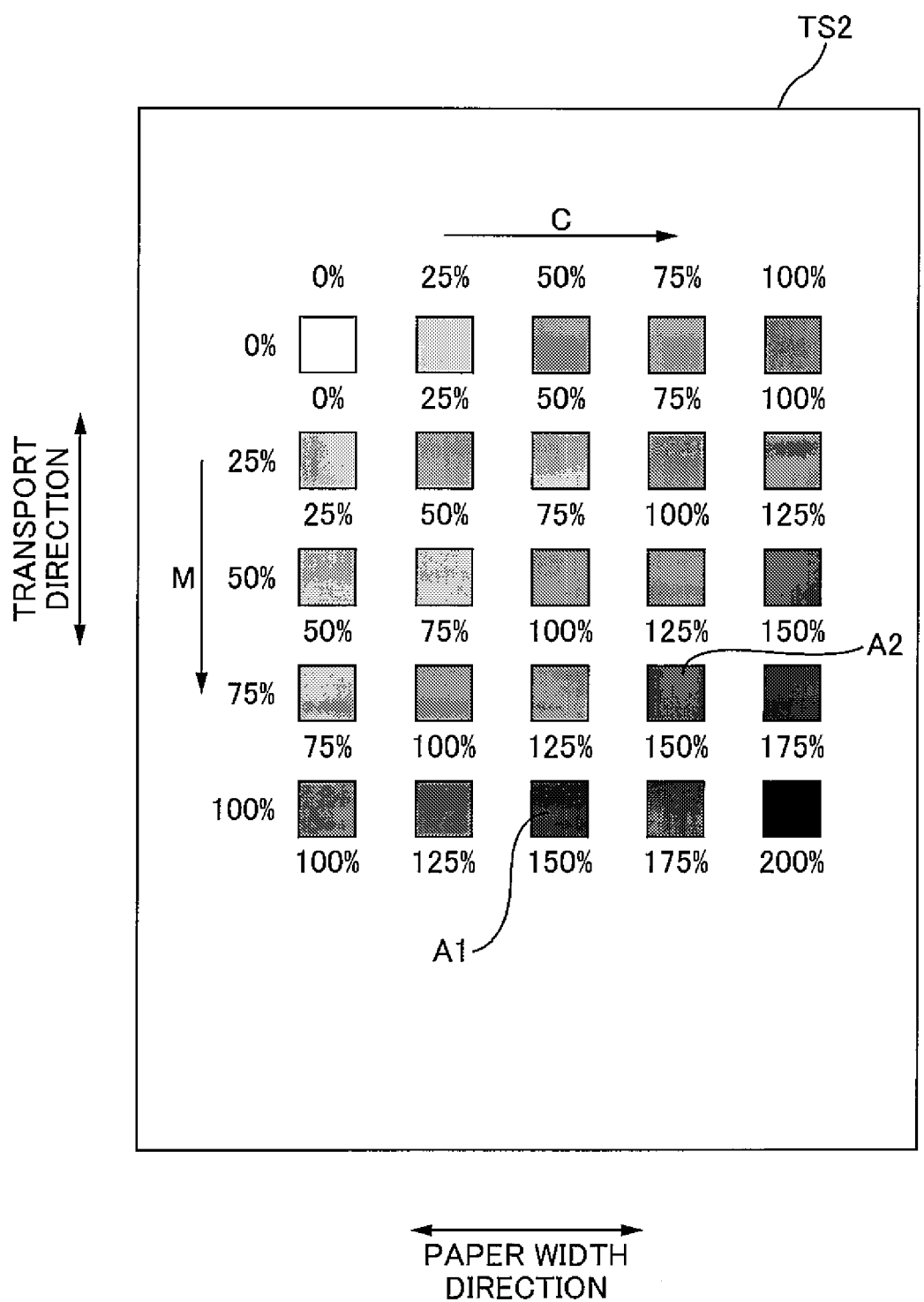
FIG. 16 is an explanatory diagram of a pattern for setting ejection limit values.

FIG. 16 is an explanatory diagram of the pattern for setting the ejection limit values. In the test sheet TS2, 25 square patterns are included. In this embodiment, each square pattern is formed by cyan ink and magenta ink of the four colors of ink. Each square pattern is formed so that the ejection amounts of cyan ink and magenta ink respectively vary (in other words, densities of each pattern vary).

Here, ink droplets of both of the cyan ink and the magenta ink can land overlapping on the region of the square pattern. Density in which the cyan ink (or the magenta ink) is ejected to entire region of the square pattern is density 100% (tone value 255), and density in which the cyan ink (or the magenta ink) is not ejected to the region is density 0% (tone value 0). For example, a square pattern A1 shown in FIG. 16 is a pattern of total density 150% that consists of the cyan ink of density 50% (tone value 128) and the magenta ink of density 100% (tone value 255). A square pattern A2 is a pattern of total density 150% that consists of the cyan ink of density 75% (tone value 192) and the magenta ink of density 75% (tone value 192).

In FIG. 16, the total density of each square pattern is shown in an area below each square pattern.

In this way, in the present step, a plurality of patterns with various ink ejection amounts (densities) per unit area are printed on the test sheet TS2. As a result, like the pattern A1 and the pattern A2, patterns whose total ejection amount (total density) of two kinds of ink per unit area varies are printed on the test sheet TS2.

Setting of Ejection Limit Values (Step S104)

The computer 110 sets, based on the 25 printed square patterns, ejection limit values at which ink can be ejected per unit area in the test sheet TS2 (also called ink-shooting limit value).

Here, the ejection limit value is the maximum ejection amount of ink that can be ejected per unit area. Here, in this embodiment, the ejection limit value is the total ejection amount of the cyan ink and the magenta ink, of four kinds of ink, which can be ejected per unit area. Therefore, the ejection limit value can be set within a range no more than density 200%. Here, since the ejection limit value is the total ejection amount of only two kinds of inks, there is no need to form a square pattern considering other kinds of ink, and therefore the number of test sheets to be printed can be decreased.

Figure 17:
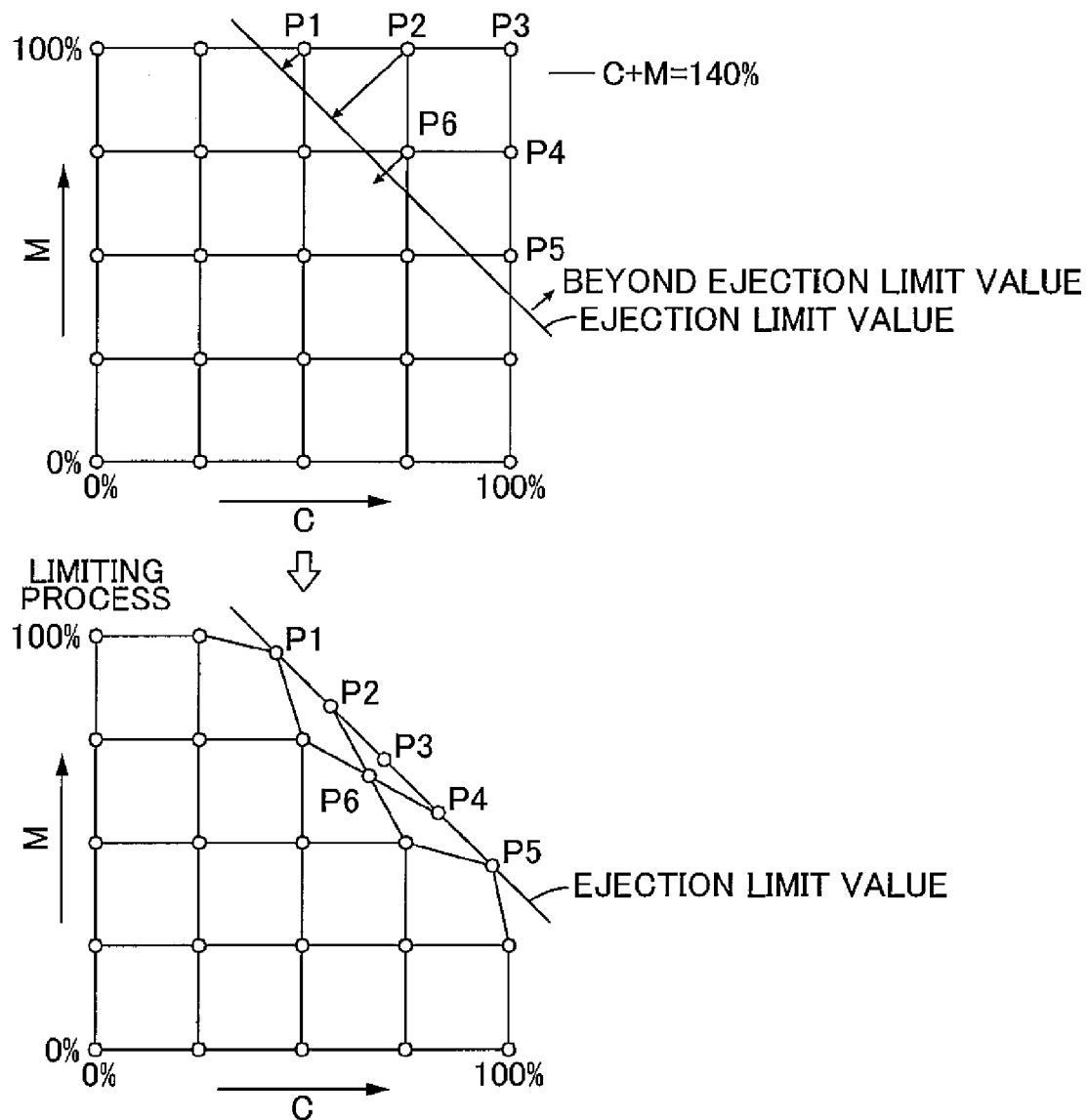
FIG. 17 is a diagram for explaining the ejection limit values.

FIG. 17 is a diagram for explaining the ejection limit values. In FIG. 17, the horizontal axis shows the ejection amount (density) of cyan ink per unit area, and the vertical axis shows the ejection amount (density) of magenta ink per unit area. In FIG. 17, 25 dots (circles in FIG. 17) are shown and each dot corresponds to the square pattern in FIG. 16. For example, a dot P1 corresponds to the square pattern A1 described above.

In FIG. 17, suppose that the ejection limit value is set as 140% and explanation continues. The upper diagram in FIG. 17 shows a table before correction, and the lower diagram shows a table after correction based on the ejection limit value. Also, a line which is a border of 140% is indicated in the diagrams. There is no limitation in a region on the left side of this line (that is, the ejection amount is less than 140%).

On the other hand, correction is performed in a region on the right side of this line. For example, the dot P1 (in which the total ejection amount is 150%) has a larger ejection amount than the ejection limit value, therefore the ejection amount is limited so that the dot P1 is positioned on the line. In other words, in the case where the tone value of image data is large, the ejection amount of ink per unit area is suppressed by correcting the tone value to be smaller based on the ejection limit value. As a result, the ink spread on paper can be suppressed.

Figure 18:
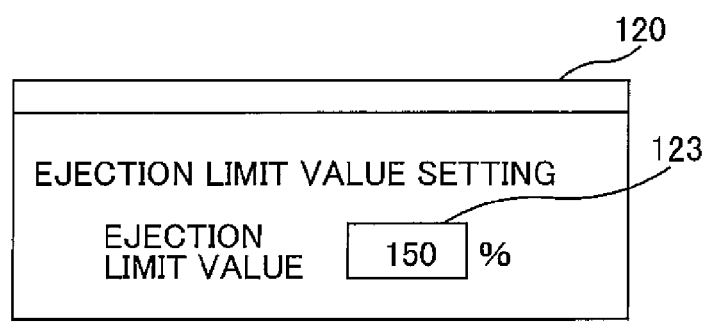
FIG. 18 is a diagram showing a setting window of the ejection limit value.

FIG. 18 is a diagram showing a setting window of the ejection limit value. When a user clicks a setting button 121b of the ejection-limit-value setting section 121 of the user interface window in FIG. 15 by the mouse of the input device 130, the computer 110 displays the setting window of the ejection limit value on the display device 120.

On the setting window of the ejection limit value, a user can input the ejection limit value that is selected by visually noticing the degree of ink spread on 25 square patterns, by the input device 130 such as a keyboard. That is, the computer 110 sets the ejection limit value corresponding to the test sheet TS2 based on the degree of ink spread on the printed square patterns. In this way, by setting the ejection limit value based on the degree of ink spread on the square patterns, it is possible to set the ejection limit value considering the degree of ink absorption of the paper X.

Further, in this embodiment, the user judges that ink is excessively spread on the square pattern A2, and the total density 150% of the square pattern A2 is inputted in an input section 123 as the ejection limit value.

Selecting Paper Type (Step S106)

The computer 110 selects paper type whose ejection limit value is similar to that of the test sheet TS2 (paper X), based on the ejection limit value corresponding to the test sheet TS2 (paper X) and a table stored in the memory 63 of the printer 1 (this table shows a relationship between paper types that are different from the type of paper X and the ejection limit values).

Figures 19, 20:
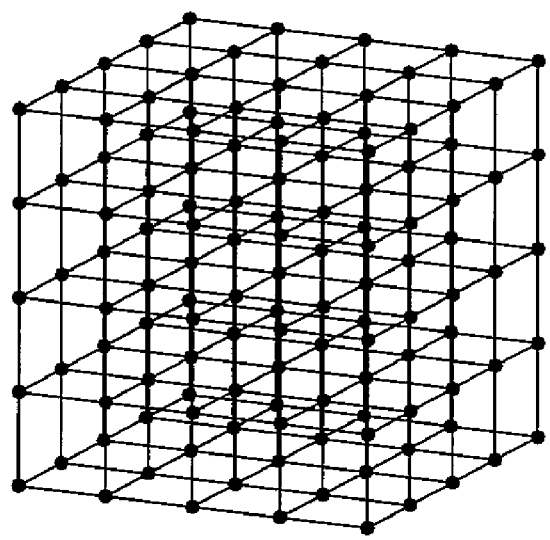
FIG. 19 is a table showing a relationship between the paper type and the ejection limit value.
FIG. 20 is a diagram showing a tone-value conversion table.

FIG. 19 is a table showing a relationship between the paper type and the ejection limit value. The data of the table is correspondence data showing a relationship between a plurality of types of paper and the ejection limit values; the plurality of types of paper are different from the paper X, and their respective tone-value conversion tables that conversion of multiple-level tone values in CMYK color space when forming print data from input image data are based on are already known.

In FIG. 19, the paper types in the correspondence data are wood free paper, matte paper A, matte paper B, gloss paper A, and gloss paper B. The characteristics of wood free paper, matte paper, and gloss paper (such as surface treatment and thickness of paper) are same as described before. Further, matte paper B tends to absorb more ink than matte paper A, and therefore the ink spread is hard to occur on matte paper B. Similarly, gloss paper B tends to absorb more ink than gloss paper A.

Also, the ejection limit values in the correspondence data (limit values in FIG. 19) are data obtained in advance in an experiment or the like, by ejecting ink to the corresponding paper. For example, the ejection limit value of wood free paper is 100%, the ejection limit value of matte paper A is 120%, and the ejection limit value of gloss paper A is 160%.

In the case where an image is printed on the paper of type shown in FIG. 19, since information regarding such paper is stored in the memory 63 (in other words, the tone-value conversion table, the BRS correction values, etc. regarding the paper are already known), there is no need to perform this process. On the other hand, the paper X whose type is not the type stored in the memory 63 (the test sheet TS2) needs to undergo this process since information regarding the paper is not stored in the memory 63.

In this embodiment, since the ejection limit value is set as 150% in S104, the computer 110 selects the ejection limit value 160% which is the closest among the ejection limit values in the table. Here, the ejection limit values that are closest to 150% in the correspondence data are 140% and 160%. In such case, the computer 110 selects a value that is larger than the ejection limit value set in step S104 (that is, 160%). This is because, in this embodiment, vividness of the color in print image is attached importance to and the color can be expressed more vividly with larger density.

In this way, the computer 110 selects the gloss paper A whose ejection limit value is closest to the ejection limit value of the test sheet TS2 (150%), among a plurality of types of paper whose tone-value conversion tables are already known in the correspondence data.

Setting of Tone-Value Conversion Table (Step S108)

The computer 110 sets the tone-value conversion table corresponding to the selected gloss paper A, as the tone-value conversion table of the test sheet TS2. That is, the tone-value conversion table corresponding to the known type of paper whose ejection limit value is closest to that of the paper X is used as the tone-value conversion table of the paper X.

FIG. 20 is a diagram showing the tone-value conversion table. In FIG. 20, for convenience of explanation, a table in CMY color space is shown. In the tone-value conversion table, the ejection limit value described before is reflected. Thereby, in the tone value conversion described before, the tone value of the image data before conversion is converted based on the tone-value conversion table in which the ejection limit value is reflected. That is, the tone value of each pixel of the image data before conversion is inputted to a corresponding grid in FIG. 20, thereby converted to a specific tone value.

The tone-value conversion table of gloss paper A shown in FIG. 20 is stored in the memory 63 in advance. Therefore, the computer 110 sets the tone-value conversion table corresponding to gloss paper A whose tone-value conversion table is already known, as the tone-value conversion table of the paper X.

Thus, based on the ejection limit value set in step S104 and the correspondence data shown in FIG. 19, the computer 110 automatically sets the tone-value conversion table corresponding to a certain type of paper, of the plurality of paper types whose tone-value conversion tables are already known, as the tone-value conversion table corresponding to the test sheet TS2. By automatically setting the tone-value conversion table in this way, processing speed increases.

As explained above, by setting based on the ejection limit value the tone-value conversion table corresponding to gloss paper A as the tone-value conversion table of the paper X, it is possible to set the tone-value conversion table suitable for the paper X of an unknown type. As a result, based on the tone-value conversion table that has been set, the tone value of the image data to be printed on the same type of paper as paper X is accurately converted.

Generation of Virtual Correction Value (Step S110)

After setting the tone-value conversion table of gloss paper A as the tone-value conversion table of the paper X of an unknown type, the computer 110 sets the BRS correction values of the paper X based on the BRS correction values of gloss paper A as described hereinafter.

First, based on the BRS correction values corresponding to gloss paper A (hereinafter, refer to as standard correction values), the computer 110 generates a virtual correction value with a larger correction amount than the standard correction value, and a virtual correction value with a smaller correction amount than the standard correction value. Here, the BRS correction values corresponding to gloss paper A are set in advance by the BRS correction value acquisition process described above.

Reason for using the BRS correction values of gloss paper A in order to obtain the BRS correction values of the paper X is as follows. Since the ejection limit values of the paper X and gloss paper A are similar, dot forming conditions on these two types of paper become also similar. Therefore, the correction values that have been set based on the BRS correction values of gloss paper A is suitable for the paper X.

An explanation of the virtual correction values is hereinafter given by citing the correction value Hb, of the BRS correction values Ha, Hb, and Hc of gloss paper A, as an example (the virtual correction values are generated for the correction values Ha and Hc in same way as the correction value Hb).

Figure 21A:
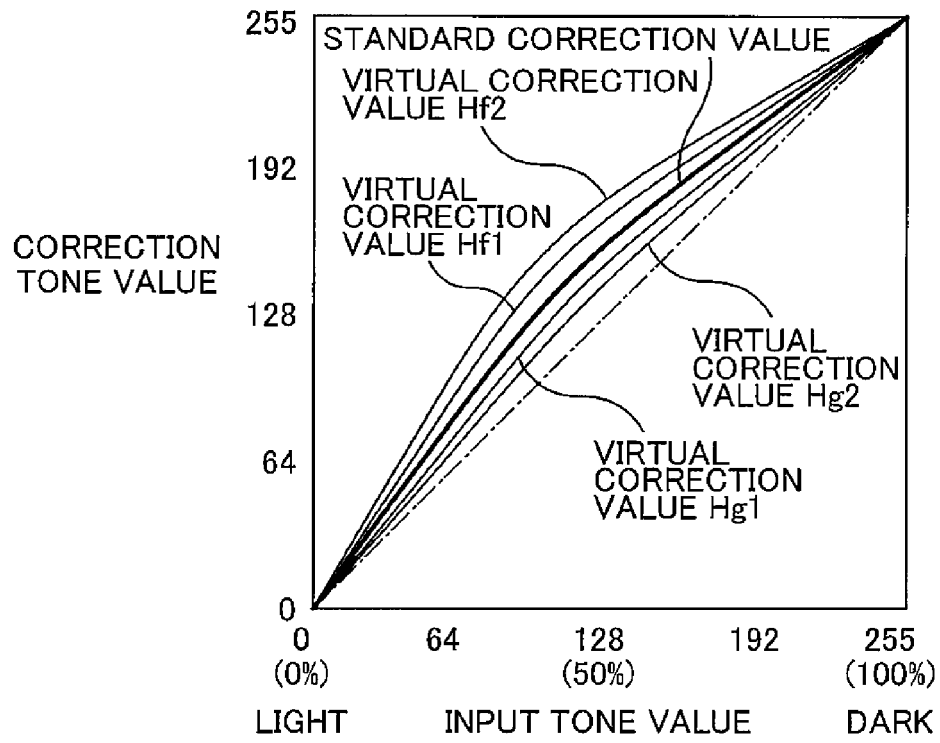
FIGS. 21A and 21B are diagrams for explaining virtual correction values.
Figure 21B:
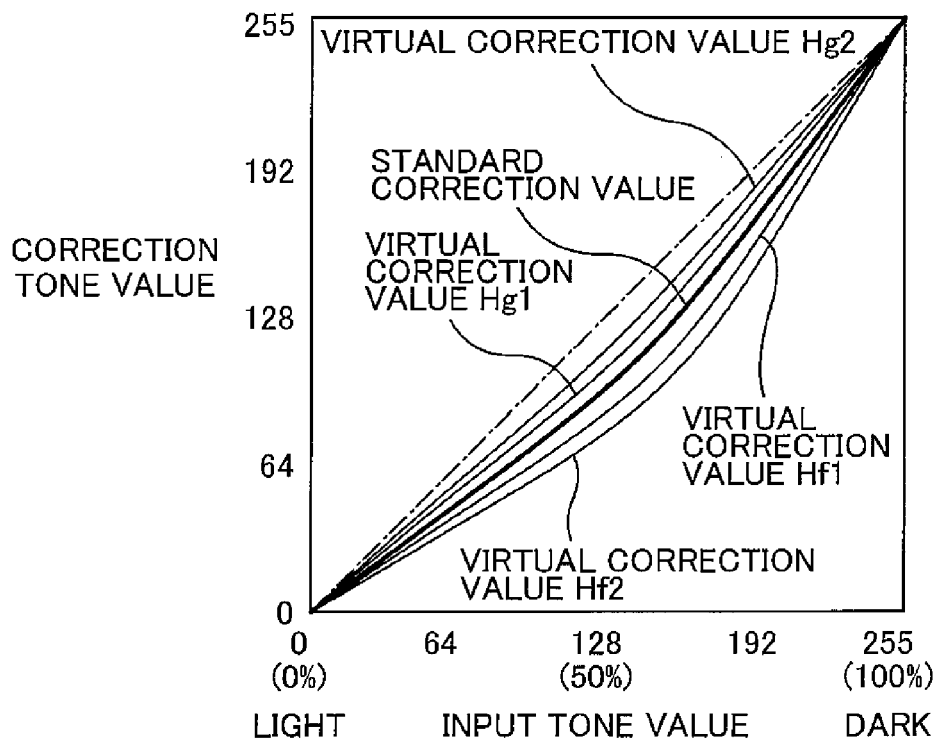

FIGS. 21A and 21B are diagrams for explaining the virtual correction values. In both FIGS. 21A and 21B, the thick curve indicates the standard correction value and the four thin curves indicate the virtual correction values. Of the four virtual correction values, virtual correction values Hf1, Hf2 have a larger correction amount than the standard correction value Hb, and virtual correction values Hg1, Hg2 have a smaller correction amount than the standard correction value Hb. Further, the correction amount of the virtual correction value Hf2 is larger than that of the virtual correction value Hf1, and the correction amount of the virtual correction value Hg2 is larger than that of the virtual correction value Hg1. The four virtual correction values are each set so that the difference between their respective correction amounts and the standard correction value Hb is constant.

In this step, the virtual correction values shown in either one of FIGS. 21A and 21B are generated. This is because it is possible to simplify process by generating the virtual correction values for corresponding standard correction value because, in the above-mentioned BRS correction value acquisition process, it can be determined to which standard correction value in FIG. 21A or FIG. 21B does the standard correction value of gloss paper A corresponds.

Printing of Confirmation Pattern (Step S112)

When a user clicks a print button 122a in a BRS-correction-value setting section 122 in the user interface window in FIG. 15, the computer 110 prints five patterns to which the standard correction value and the four virtual correction values apply, onto paper X that is different from gloss paper A (it is the same type of paper as the paper X on which the square patterns are printed, but is not the paper X on which the square patterns are printed). Each of the five patterns is the confirmation pattern for confirming effects of each correction value on the paper X. For convenience of explanation, the paper X on which the confirmation patterns are printed is referred to as a test sheet TS3.

Figure 22:
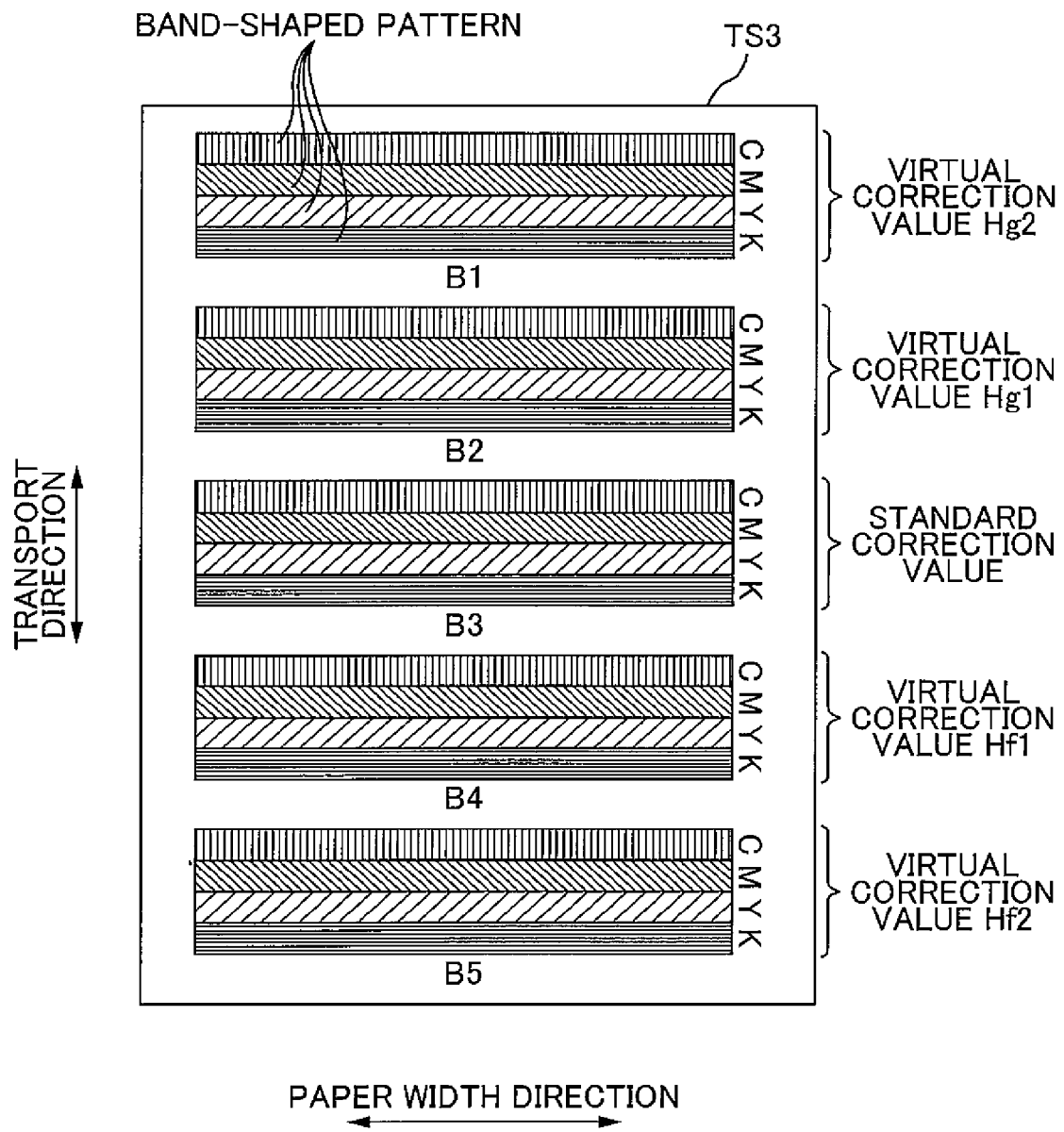
FIG. 22 is an explanatory diagram of confirmation patterns.

FIG. 22 is an explanatory diagram of the confirmation patterns. Five confirmation patterns for each of the correction values are printed on the test sheet TS3. A confirmation pattern B1 is a pattern to which the virtual correction value Hg2 applies, a confirmation pattern B2 is a pattern to which the virtual correction value Hg1 applies, a confirmation pattern B3 is a pattern to which the standard correction value applies, a confirmation pattern B4 is a pattern to which the virtual correction value Hf1 applies, and a confirmation pattern B5 is a pattern to which the virtual correction value Hf2 applies.

The confirmation patterns B1 to B5 each consist of four band-shaped patterns for each color. These band-shaped patterns are formed by making all nozzles in each of the heads 41 eject ink. Also an instruction tone value (instructed density) before correction at printing the confirmation pattern (before applying the correction value) is all set as the tone value of 128 (middle tone value). Therefore, since there is no need to print the confirmation pattern for the other tone values (tone values 64 and 192), the number of patterns to be printed is suppressed.

And the confirmation pattern is printed corresponding to the corrected instruction tone value. For example, the confirmation pattern B3 is printed in the instruction tone value that is obtained by correcting tone value 128 with the standard correction value. The confirmation pattern B1 is printed in the instruction tone value that is obtained by correcting tone value 128 with the virtual correction value Hg2. As a result, actual tone values of the respective confirmation patterns vary.

Selecting Confirmation Pattern whose Density Unevenness is Least Noticeable (Step S114)

The user visually selects, among the five confirmation patterns printed on the test sheet TS3 (paper X), a confirmation pattern with the smallest degree of density unevenness (whose density unevenness is least noticeable). As a result that the user visually selects the confirmation pattern in this way, the pattern can be selected in a simple configuration.

Figure 23:
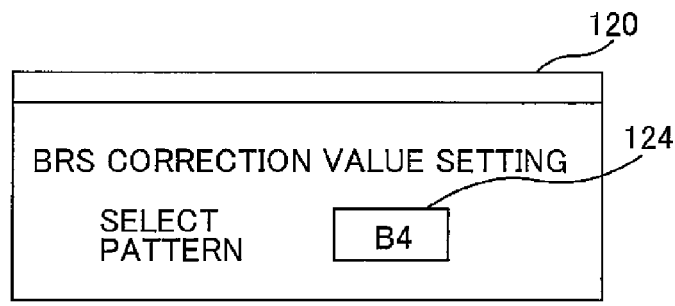
FIG. 23 is a diagram showing a select window of the confirmation pattern.

FIG. 23 is a diagram showing a select window of the confirmation pattern. When the user clicks a setting button 122b of the BRS-correction-value setting section 122 in the user interface window in FIG. 15, the computer 110 displays a pattern select window on the display device 120. On this pattern select window, the user selects the confirmation pattern whose density unevenness is least noticeable by the input device 130. Here, suppose that the confirmation pattern whose density unevenness is least noticeable is the confirmation pattern B4. Then, the user selects 84 in a select section 124.

As a result that the user selects B4 in the select section 124, the computer 110 recognizes that the confirmation pattern whose density unevenness is least noticeable is the confirmation pattern B4.

Setting of BRS Correction Values Corresponding to Paper X (Step S116)

The computer 110 sets the virtual correction value Hf1 corresponding to the confirmation pattern B4 selected by the user, as the BRS correction value corresponding to the paper X. That is, based on the confirmation patterns B1 to B5 printed on the test sheet TS3 (paper X), the computer 110 sets any one of the standard correction value and the four virtual correction values Hf1, Hf2, Hg1, and Hg2, as the BRS correction value for correcting density of an image to be printed on the paper X. In this way, since any one of five correction values is set as the correction value corresponding to the paper X, it is possible to easily obtain the correction value of the paper X.

And, the computer 110 transmits the virtual correction value Hf1 (correction data) corresponding to the paper X to the printer 1 and stores it in the memory 63 of the printer 1. Further, the computer 110 obtains virtual correction values corresponding to the correction values Ha and Hc from, for example, the difference between the standard correction value and the virtual correction value Hg1. And the obtained virtual correction values are stored in the memory 63.

Thereafter, the printer 1 that stores the BRS correction values corresponding to the paper X (the virtual correction value Hf1 and the like) corrects image data of an image to be printed on the same type of paper as the paper X, based on the BRS correction values. The printer 1 performs printing based on the corrected image data. Thereby, the image printed on the same type of paper as the paper X becomes an image in which density unevenness according to nozzle characteristics is suppressed.

Further, in the acquisition process of BRS correction values corresponding to paper of an unknown type described above, generation of the virtual correction value (step S110) corresponds to a step of generating correction values; printing of the confirmation pattern (step S112) corresponds to a step of printing patterns; and selecting the confirmation pattern whose density unevenness is least noticeable (step S114) and setting the BRS correction values corresponding to the paper X (step S116) correspond to a step of setting correction values. Also, gloss paper A corresponds to a first medium; and paper X corresponds to a second medium. The standard correction value corresponds to a first correction value; the virtual correction value Hf1 and the virtual correction value Hf2 correspond to second correction values; and the virtual correction value Hg1 and the virtual correction value Hg2 correspond to third correction values. The confirmation pattern B3 corresponds to a first pattern, the confirmation pattern B4 and the confirmation pattern B5 correspond to second patterns, and the confirmation pattern B1 and the confirmation pattern B2 correspond to third patterns.

Other Examples

In above step S114 (selecting the confirmation pattern whose density unevenness is least noticeable), a pattern is selected by visual check. However, there is no limitation to this. For example, the density of each of the confirmation patterns B1 to B5 may be measured by the scanner 150, and of the measured confirmation patterns B1 to B5, any one confirmation pattern may be selected whose range of variation of the measurement values is smallest.

Figure 24:
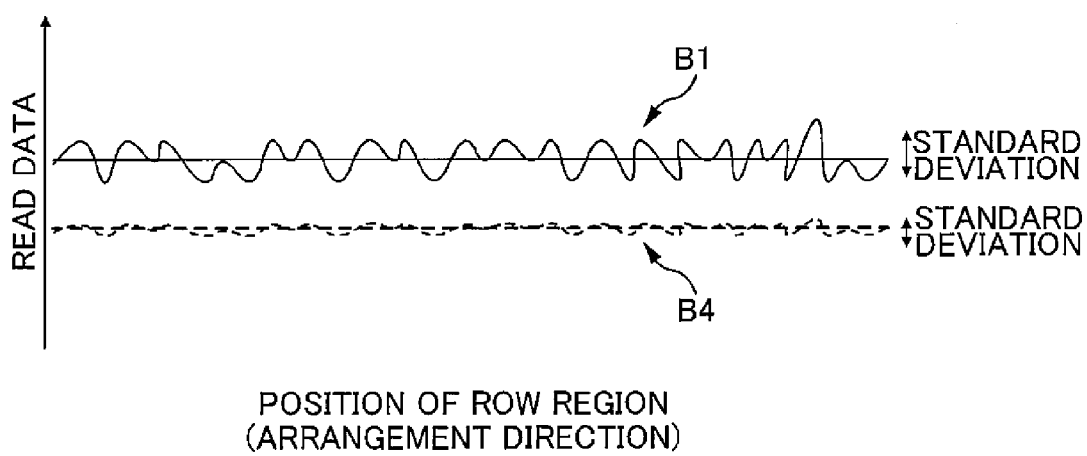
FIG. 24 is a diagram showing measurement values of the density of the confirmation patterns measured by a scanner 150.

FIG. 24 is a diagram showing the measurement values of the density of the confirmation patterns measured by the scanner 150. In FIG. 24, the horizontal axis in the graph shows the position of the row region, and the vertical axis shows the tone value of the density. For convenience of explanation, only the measurement values of the confirmation patterns B1 and B4 are shown, and the measurement values of the other patterns are omitted.

As shown in FIG. 24, the density fluctuations in the measurement value of the confirmation pattern B1 is large (large standard deviation). This means that the density unevenness is large (density unevenness is noticeable). On the other hand, the density fluctuations in the measurement values of the confirmation pattern B4 is small (small standard deviation). This means that the density unevenness is small (density unevenness is unnoticeable). Density fluctuations in the measurement values of the other confirmation patterns B2, B3, and B5 measured by the scanner 150 (not shown) are larger than the density fluctuations in the measurement values of the confirmation pattern B4. As a result, the confirmation pattern 84 is the pattern whose density unevenness is least noticeable.

From this measurement result, the user selects B4 at the select section 124 in the pattern select window in FIG. 23. In this way, in the case where the confirmation pattern is selected based on the density fluctuations of the confirmation patterns measured by the scanner 150, a pattern whose density unevenness is least noticeable can be selected with high precision (in other words, the correction values can be selected with high precision).

After selecting the pattern based on the measurement of the scanner 150, the computer 110 sets the virtual correction value Hf1 corresponding to the selected confirmation pattern B4, as the BRS correction value corresponding to the paper X.

Effectiveness of Printing System 100 of This Embodiment

As shown in FIG. 14, the acquisition process of BRS correction values corresponding to paper of an unknown type described above includes: (a) generating, based on the first correction value (standard correction value) that has been set in advance to correct the density of an image to be printed on the first medium (here, gloss paper A), the second correction value that has a larger correction amount than the standard correction value (hereinafter, a description is given using the virtual correction value Hf1 as an example), and the third correction value that has a smaller correction amount than the standard correction value (hereinafter, a description is given using the virtual correction value Hg1 as an example); (b) printing respectively the first pattern (confirmation pattern B3) to which the first correction value is applied, the second pattern (confirmation pattern B4) to which the second correction value is applied, and the third pattern (confirmation pattern B2) to which the third correction value is applied, on the second-medium (paper X) that differs in type from the first medium, by ejecting ink from the head including the plurality of nozzles that eject ink; and (c) setting, based on the first pattern, the second pattern, and the third pattern that have been printed on the paper X, any one of the first correction value, the second correction value, and the third correction value, as the BRS correction value used in correcting the density of an image to be printed on the paper X.

This enables the density unevenness of an image printed on paper of an unknown type (density unevenness according to nozzle characteristics) to be suppressed appropriately and easily. Hereinafter, such effectiveness of the printing system is described.

As explained in Related Art, in the case where types of paper vary, variations occurs in the degree of ink absorption due to variations in the surface treatment (such as coating) of the paper and the like. As a result, the density unevenness of the print image varies depending on the paper types even if dots are formed by ejecting ink from the same nozzle.

Conventionally, the BRS correction value was obtained by printing the pattern for detecting density unevenness on the particular type of paper (that is, the dedicated paper). On the other hand, no correction value was obtained for paper other than the dedicated paper. Therefore, density unevenness of a print image printed on paper other than the dedicated paper cannot be appropriately suppressed.

Whereas, in this embodiment, the first correction value (standard correction value) corresponding to the gloss paper A set in advance, the second correction value (virtual correction value Hf1) and the third correction value (virtual correction value Hg1) that are generated from the first correction value are applied to the three confirmation patterns B3, B4 and B2 respectively, and these patterns are printed on the unknown paper X (FIG. 22). Based on the three printed confirmation patterns, any one of the three correction values is set as the BRS correction value corresponding to the paper X (FIG. 23).

Setting one of the three correction values as the correction value of the paper X enables the BRS correction value of the paper X to be easily obtained. Besides, since selecting the correction value among the three correction values enables the highly precise correction value to be obtained, the BRS correction value appropriate to the paper X can be obtained. As a result, the density unevenness of an image printed on the paper X is suppressed.

Thus, in this embodiment, the density unevenness of an image printed on the paper X of an unknown type is appropriately and easily suppressed.

Further, in the above embodiment, the density tone values of the first pattern (confirmation pattern B3), the second pattern (confirmation pattern B4), and the third pattern (the confirmation pattern B2) before correction are the same middle tone value (specifically, tone value 128). And when printing the patterns as mentioned above, the first pattern, the second pattern, and the third pattern corresponding to the corrected density tone values are respectively printed on the paper X (FIG. 22).

In such case, since there is no need to print the confirmation pattern for various tone values before correction, the number of the confirmation patterns to be printed can be reduced. As a result, it is possible to set the BRS correction value corresponding to the paper X quickly.

Further, in the above embodiment, the ejection limit value (maximum ejection amount) of ink that can be ejected per unit area of the paper X is closest to the ejection limit value of gloss paper A, of ejection limit values of the plurality of types of paper including gloss paper A (wood free paper, gloss paper, and matte paper) which correction values for correcting the density of an image to be printed on are previously set (FIG. 19).

Since the ejection limit values of paper X and gloss paper A are close to each other, the state of dot formation on both types of paper become similar. Therefore, the correction value that is set based on the BRS correction value of the gloss paper A is appropriate to the paper X. As a result, the BRS correction value for the paper X can be set with high precision.

Further, in the above embodiment, in the case of setting of the correction value, the density of each of the first pattern (confirmation pattern B3), the second pattern (confirmation pattern B4), and the third pattern (confirmation pattern B2) is measured by the scanner 150 (FIG. 24), and among the three measured patterns, a pattern a measured density of which has the smallest range of fluctuation is selected (FIG. 23). And, the BRS correction value corresponding to the selected pattern is set as the BRS correction value corresponding to the paper X.

In such case, since selecting the confirmation pattern based on the values measured by the scanner 150 enables the correction value to be selected with high precision, the optimum BRS correction value for the paper X can be set.

Further, in above embodiment, in the case of setting of the correction value, a pattern is visually selected, among the first pattern (confirmation pattern B3), the second pattern (confirmation pattern B4) and the third pattern (confirmation pattern B2), as a pattern having the smallest degree of density unevenness (FIG. 23), and the BRS correction value corresponding to the selected pattern is set as the BRS correction value corresponding to the paper X.

In such case, since visually selecting the confirmation pattern enables the correction value to be selected in a simple configuration, the correction value setting method in which it is possible to easily set the BRS correction value corresponding to the paper X can be realized.

Other Embodiments

Furthermore, although description was given of the printing system and the like in above description, the foregoing embodiments are for the purpose of elucidating the invention and are not to be interpreted as limiting the invention. The invention can of course be altered and improved without departing from the gist thereof and includes functional equivalents. In particular, embodiments described below are also included in the invention.

A printer was described in the foregoing embodiments, but there is no limitation to this. For example, the same technology as that of the present embodiment can also be applied to various types of liquid ejecting apparatuses that employ inkjet technology, including color filter manufacturing apparatuses, dyeing apparatuses, micro-processing apparatuses, semiconductor manufacturing apparatuses, surface processing apparatuses, three-dimensional shape forming machines, liquid vaporizing apparatuses, organic EL manufacturing apparatuses (in particular, macromolecular EL manufacturing apparatuses), display manufacturing apparatuses, film formation apparatuses, and DNA chip manufacturing apparatuses.

In the foregoing embodiments, the image data before the tone value conversion (after the resolution conversion) was CMYK data, but there is no limitation to this. For example, the image data can be RGB data expressed in RGB color space. In such case, color conversion for converting the RGB data into the CMYK data is performed in addition to the tone value conversion.

In the foregoing embodiments, description was given using as an example the head unit 40 whose heads do not move as shown in FIG. 4A. However, the technology of the present embodiment can also be applied to so-called serial printers (printers whose head moves in a direction intersecting the transport direction).

In the foregoing embodiments, the printer 1 as an example of liquid ejecting apparatus only had image print function, however there is no limitation to this. For example, the liquid ejecting apparatus can have functions of the scanner 150 and perform the forementioned acquisition process of the BRS correction value corresponding to paper of an unknown type by the controller of the printer.

The printer 1 described in the foregoing embodiments ejects an ink by applying voltage to the drive element (piezo element) to cause an ink chamber to expand and contract. However, there is no limitation to this. For example, a printer that generates bubbles in the nozzle using a heating element and ejects ink by such bubbles may also be employed.

What is claimed is:

1. A correction value setting method comprising:
   generating, based on a first correction value that has been set in advance and is used in correcting a density of an image to be printed on a first medium, a second correction value that has a larger correction amount than the first correction value and a third correction value that has a smaller correction amount than the first correction value;
   printing respectively a first pattern to which the first correction value is applied, a second pattern to which the second correction value is applied, and a third pattern to which the third correction value is applied, on a second medium that differs in type from the first medium, by ejecting liquid from a head including a plurality of nozzles that eject liquid; and
   setting, based on the first pattern, the second pattern, and the third pattern that have been printed on the second medium, one of the first correction value, the second correction value, and the third correction value, as a correction value used in correcting a density of an image to be printed on the second medium.

2. A correction value setting method according to claim 1, wherein density tone values of the first pattern, the second pattern, and the third pattern are density tone values obtained by applying the first correction value, the second correction value, and the third correction value respectively to a same middle tone value.

3. A correction value setting method according to claim 1, wherein a maximum ejection amount of liquid that can be ejected per unit area on the second medium is closest to a maximum ejection amount on the first medium, of maximum ejection amounts of a plurality of media which a correction value used in correcting a density of an image to be printed on is set in advance.

4. A correction value setting method according to claim 1, wherein
   in the case of the setting of the correction value used in correcting the density of the image to be printed on the second medium,
   a density of each of the first pattern, the second pattern, and the third pattern is measured by a measurement device;
   among the three measured patterns, a pattern, a measured density of which has the smallest range of fluctuation, is selected; and
   the correction value corresponding to the selected pattern is set as the correction value corresponding to the second medium.

5. A correction value setting method according to claim 1, wherein in the case of the setting of the correction value used in correcting the density of the image to be printed on the second medium, the correction value corresponding to a pattern that is visually selected, among the first pattern, the second pattern, and the third pattern, as a pattern having the smallest degree of density unevenness is set as the correction value corresponding to the second medium.

6. A liquid ejecting apparatus comprising:
   a head including a plurality of nozzles that eject liquid; and
   a controller that
   generates, based on a first correction value that has been set in advance and is used in correcting a density of an image to be printed on a first medium, a second correction value that has a larger correction amount than the first correction value and a third correction value that has a smaller correction amount than the first correction value,
   prints respectively a first pattern to which the first correction value is applied, a second pattern to which the second correction value is applied, and a third pattern to which the third correction value is applied, on a second medium that differs in type from the first medium, by ejecting liquid from the head, and
   sets, based on the first pattern, the second pattern, and the third pattern that have been printed on the second medium, one of the first correction value, the second correction value, and the third correction value, as a correction value used in correcting a density of an image to be printed on the second medium.

7. A printing system comprising:
   a head including a plurality of nozzles that eject liquid; and
   a controller that
   generates, based on a first correction value that has been set in advance and is used in correcting a density of an image to be printed on a first medium, a second correction value that has a larger correction amount than the first correction value and a third correction value that has a smaller correction amount than the first correction value,
   prints respectively a first pattern to which the first correction value is applied, a second pattern to which the second correction value is applied, and a third pattern to which the third correction value is applied, on a second medium that differs in type from the first medium, by ejecting liquid from the head, and
   sets, based on the first pattern, the second pattern, and the third pattern that have been printed on the second medium, one of the first correction value, the second correction value, and the third correction value, as a correction value used in correcting a density of an image to be printed on the second medium.

8. A storage medium having a program stored thereon, the program comprising:
enabling a liquid ejecting apparatus to realize
a function of generating, based on a first correction value that has been set in advance and is used in correcting a density of an image to be printed on a first medium, a second correction value that has a larger correction amount than the first correction value and a third correction value that has a smaller correction amount than the first correction value,
a function of printing respectively a first pattern to which the first correction value is applied, a second pattern to which the second correction value is applied, and a third pattern to which the third correction value is applied, on a second medium that differs in type from the first medium, by ejecting liquid from a head including a plurality of nozzles that eject liquid, and
a function of setting, based on the first pattern, the second pattern, and the third pattern that have been printed on the second medium, one of the first correction value, the second correction value, and the third correction value, as a correction value used in correcting a density of an image to be printed on the second medium.

* * * * *